United States Patent
Ber et al.

(10) Patent No.: US 8,306,987 B2
(45) Date of Patent: Nov. 6, 2012

(54) SYSTEM AND METHOD FOR MATCHING SEARCH REQUESTS AND RELEVANT DATA

(76) Inventors: Ofer Ber, Herzlia (IL); Ran Ber, Herzlia (IL)

(*) Notice: Subject to any disclaimer, the term of this patent is extended or adjusted under 35 U.S.C. 154(b) by 652 days.

(21) Appl. No.: 12/379,892

(22) Filed: Mar. 4, 2009

(65) Prior Publication Data

US 2009/0254543 A1 Oct. 8, 2009

Related U.S. Application Data

(60) Provisional application No. 61/064,915, filed on Apr. 3, 2008.

(51) Int. Cl.
*G06F 7/00* (2006.01)
*G06F 17/30* (2006.01)
(52) U.S. Cl. .................................................... 707/752
(58) Field of Classification Search ................ 707/752
See application file for complete search history.

(56) References Cited

U.S. PATENT DOCUMENTS

| | | | |
|---|---|---|---|
| 5,692,176 A | 11/1997 | Holt et al. | |
| 5,926,812 A | 7/1999 | Hilsenrath et al. | |
| 6,633,868 B1 | 10/2003 | Min et al. | |
| 2002/0052901 A1* | 5/2002 | Guo et al. | 707/531 |
| 2003/0120642 A1* | 6/2003 | Egilsson et al. | 707/3 |
| 2004/0133560 A1* | 7/2004 | Simske | 707/3 |
| 2004/0172378 A1* | 9/2004 | Shanahan et al. | 707/1 |
| 2004/0179720 A1 | 9/2004 | Chen et al. | |
| 2005/0154690 A1* | 7/2005 | Nitta et al. | 706/46 |
| 2005/0223042 A1* | 10/2005 | Evans et al. | 707/104.1 |
| 2005/0262050 A1* | 11/2005 | Fagin et al. | 707/3 |
| 2006/0004753 A1* | 1/2006 | Coifman et al. | 707/6 |
| 2006/0074883 A1* | 4/2006 | Teevan et al. | 707/3 |
| 2006/0136428 A1* | 6/2006 | Syeda-Mahmood | 707/100 |
| 2006/0161560 A1* | 7/2006 | Khandelwal et al. | 707/100 |
| 2007/0005566 A1* | 1/2007 | Bobick et al. | 707/2 |
| 2007/0033221 A1* | 2/2007 | Copperman et al. | 707/103 R |
| 2007/0208693 A1* | 9/2007 | Chang et al. | 707/2 |
| 2008/0077570 A1* | 3/2008 | Tang et al. | 707/5 |
| 2008/0134100 A1* | 6/2008 | Ferrari et al. | 715/854 |
| 2008/0319971 A1* | 12/2008 | Patterson | 707/5 |
| 2009/0094262 A1* | 4/2009 | Marvit et al. | 707/100 |
| 2010/0070448 A1* | 3/2010 | Omoigui | 706/47 |

* cited by examiner

*Primary Examiner* — Robert Beausoliel, Jr.
*Assistant Examiner* — Nicholas Allen

(57) ABSTRACT

A system and methods for matching between search requests and relevant data (web pages, online documents, essays, online text in general, images, video, footage etc.). The system comprises three components that can work separately or together and can be integrated with other search engine methods in order to further improve the relevancy of search results. The system can find similarity between different document and measure the distance (in similarity) between documents. The three components are: Context based understanding, comprising putting the documents in the context of aspects of the human knowledge external to the documents, Partial Sentence analysis and 100 percentage points to keyword/tag sets.

21 Claims, 30 Drawing Sheets

Legend:
Essence: ⟶
Contain: ----▶

| WEIGHTED KEYWORDS / TAG TABLE | |
|---|---|
| TERM | WEIGHT |
| TERM1 | WEIGHT1 |
| TERM2 | WEIGHT2 |
| ● ● ● | |
| TERM n | WEIGHT n |
| TOTAL WEIGHT | COLUMN MUST TOTAL PREDEFINED TOTAL WEIGHT (e.g. 100) |

400

410 — SINGLE KEYWORD

420 — STRING OF TERM ' T ' II SUB-TERM ( ' S ' of T)

430 — KEYWORD 1 II KEYWORD 2 II KEYWORD...3 (All synonyms)

FIG. 4

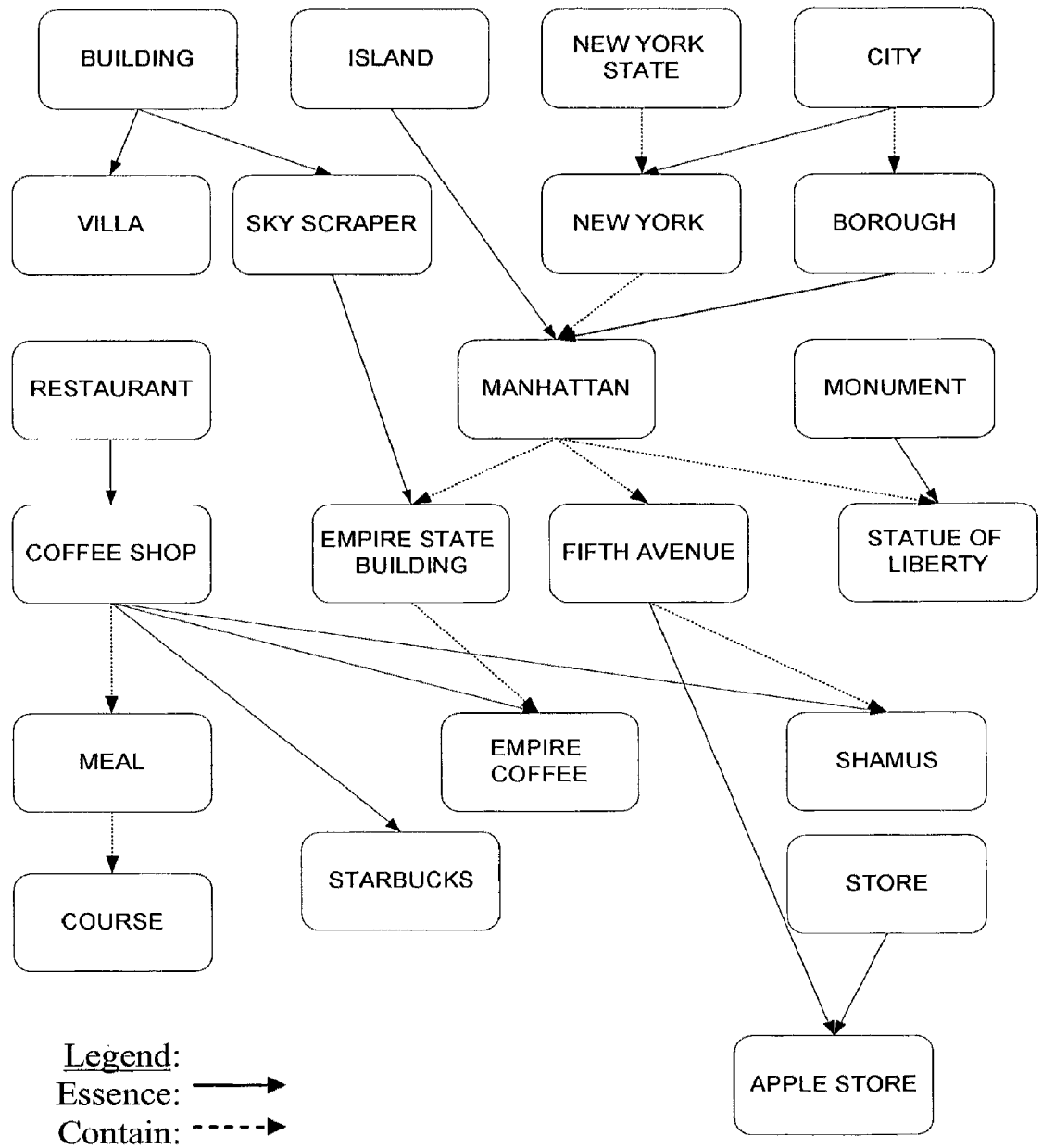
FIG. 10-A
INITIAL HKS

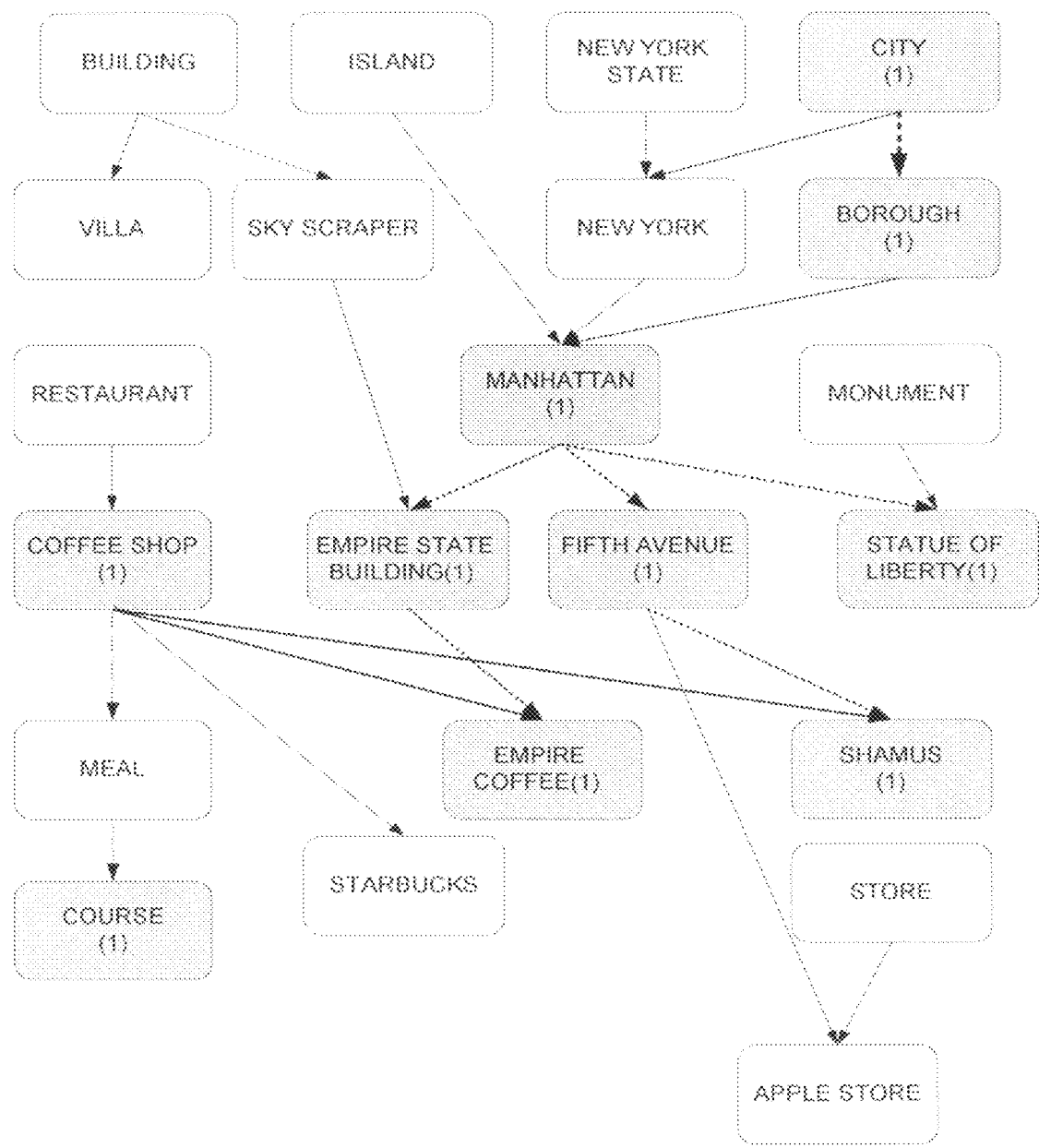
FIG. 10-B
COLORING IDENTIFIED TERMS
WITH HISTOGRAMIC VALUES

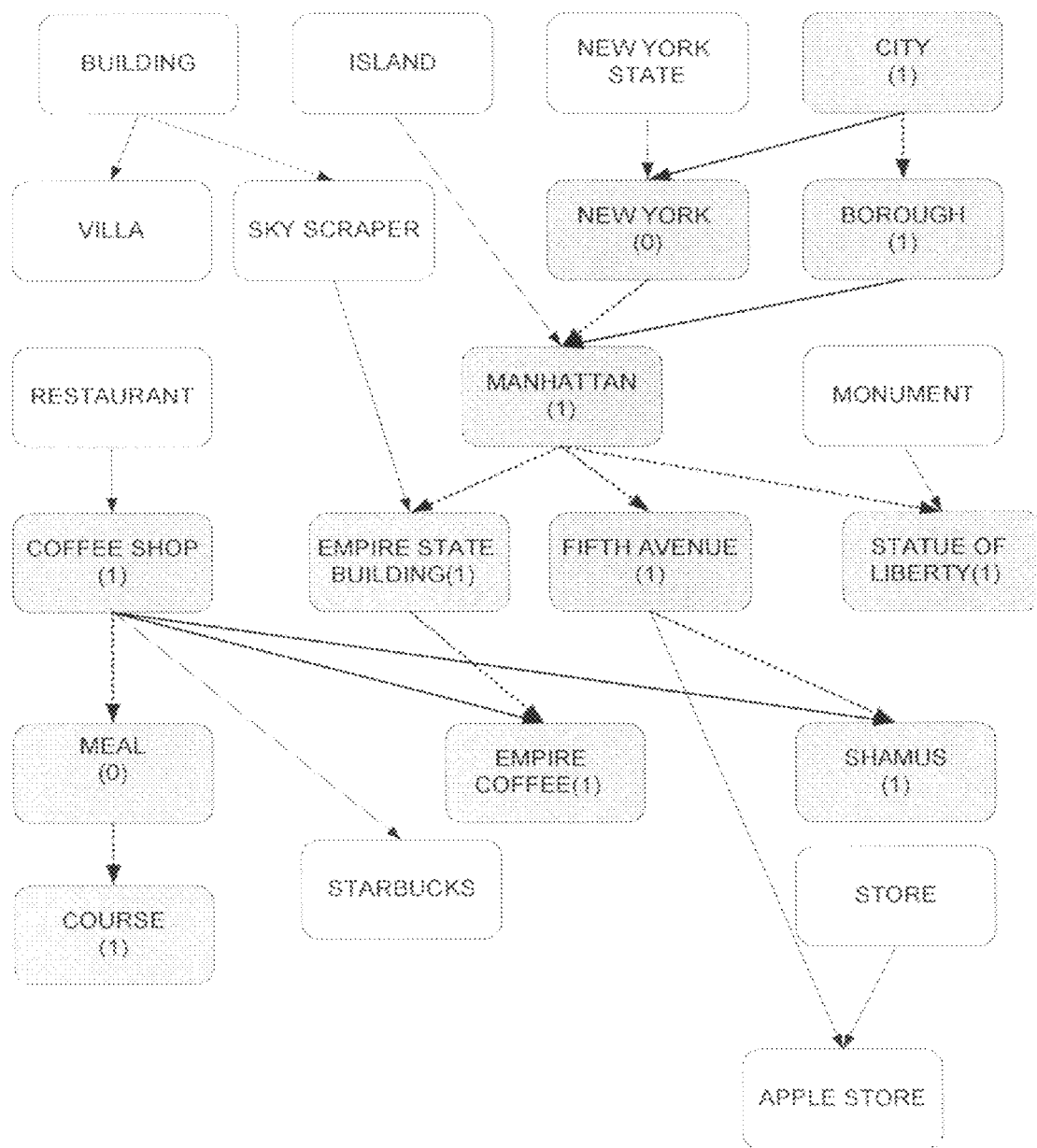
FIG. 10-C
FILLING GAPS – COLORING ALL NODES
BETWEEN COLORED NODES

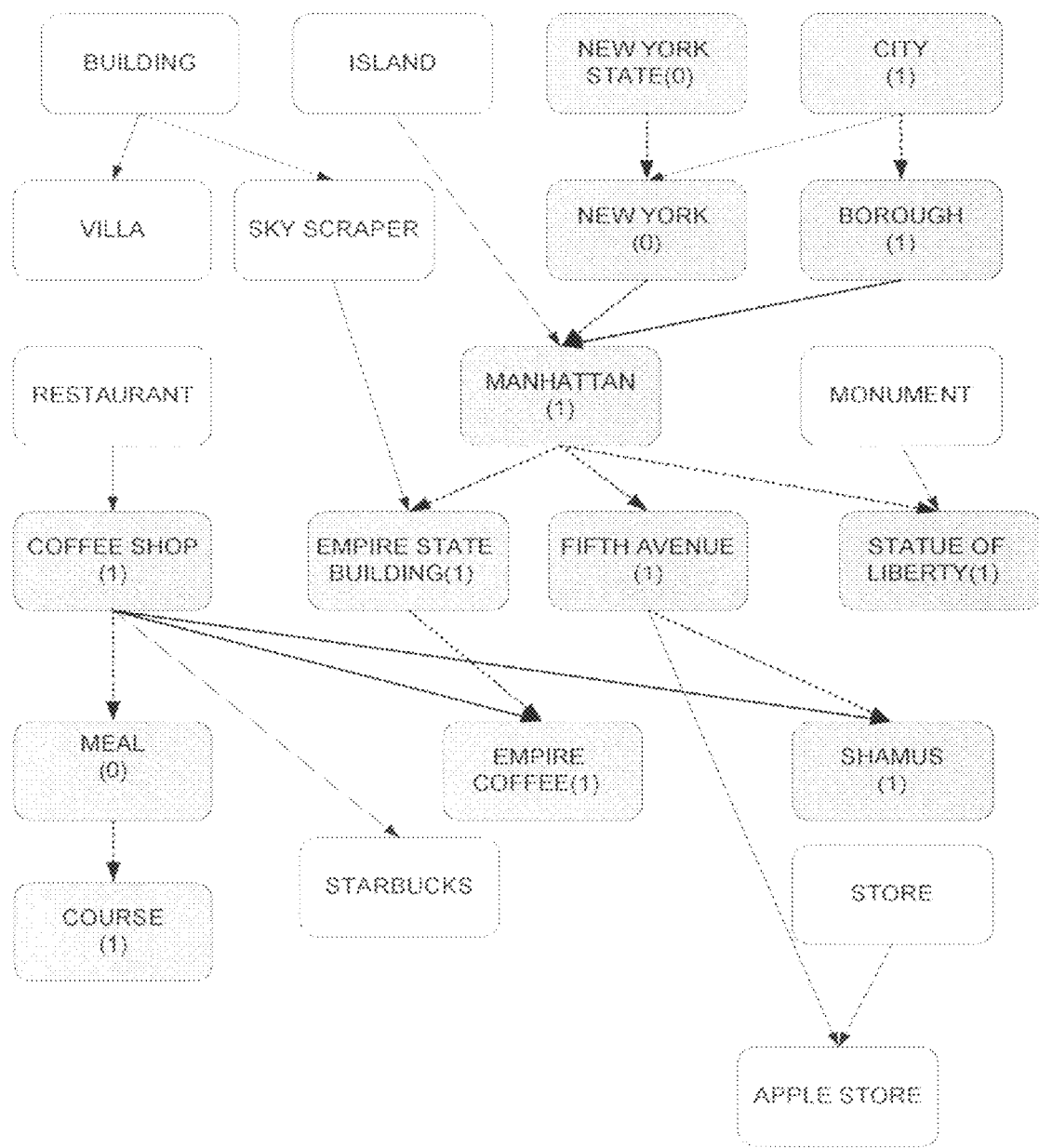
FIG. 10-D
MARKING CONTAIN AND ESSENCE
PREDECESSORS

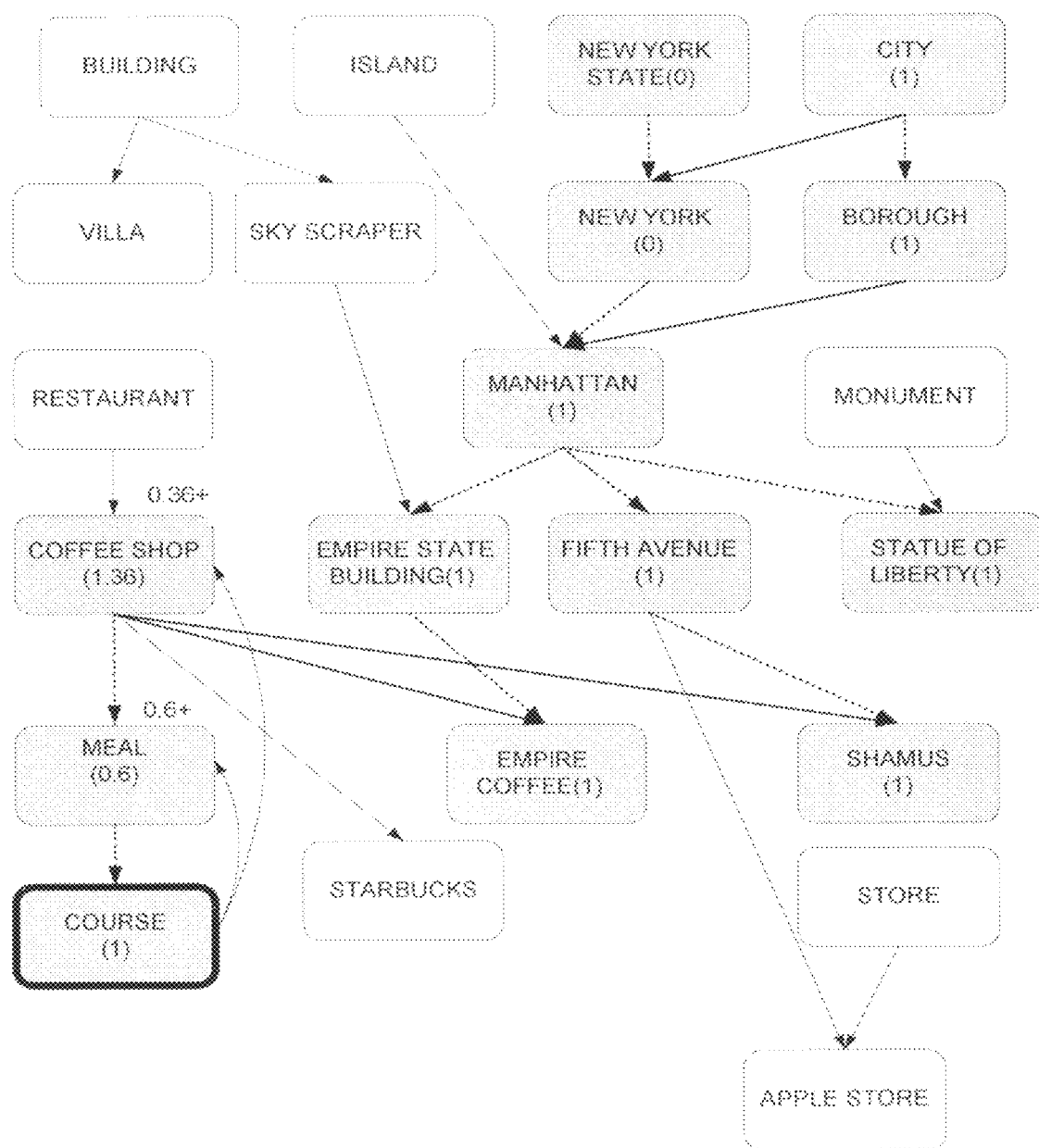
FIG. 10-E
GRADING PROCESS FOR
"COURSE"

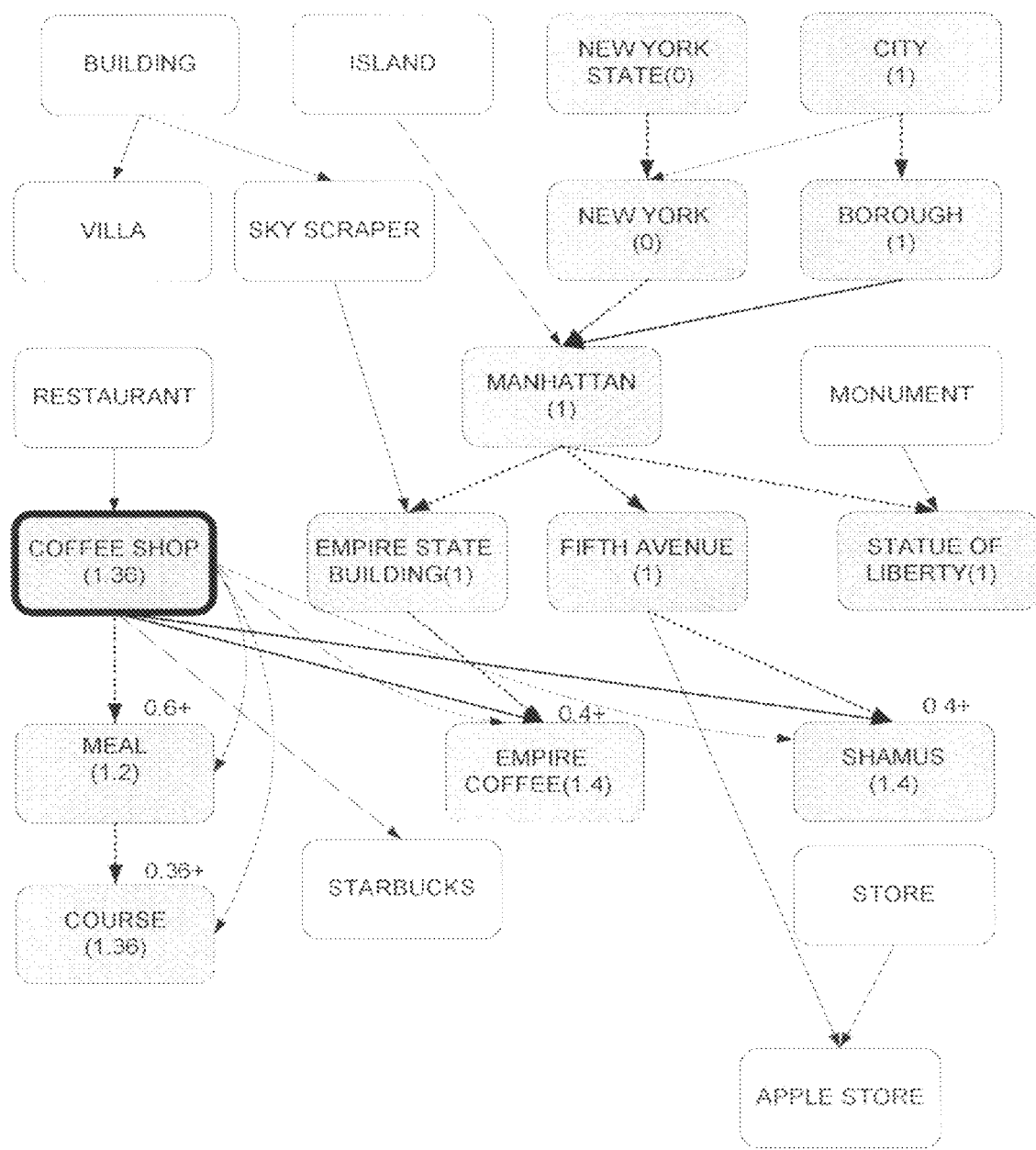
FIG. 10-F
GRADING PROCESS FOR
"COFFEE SHOP"

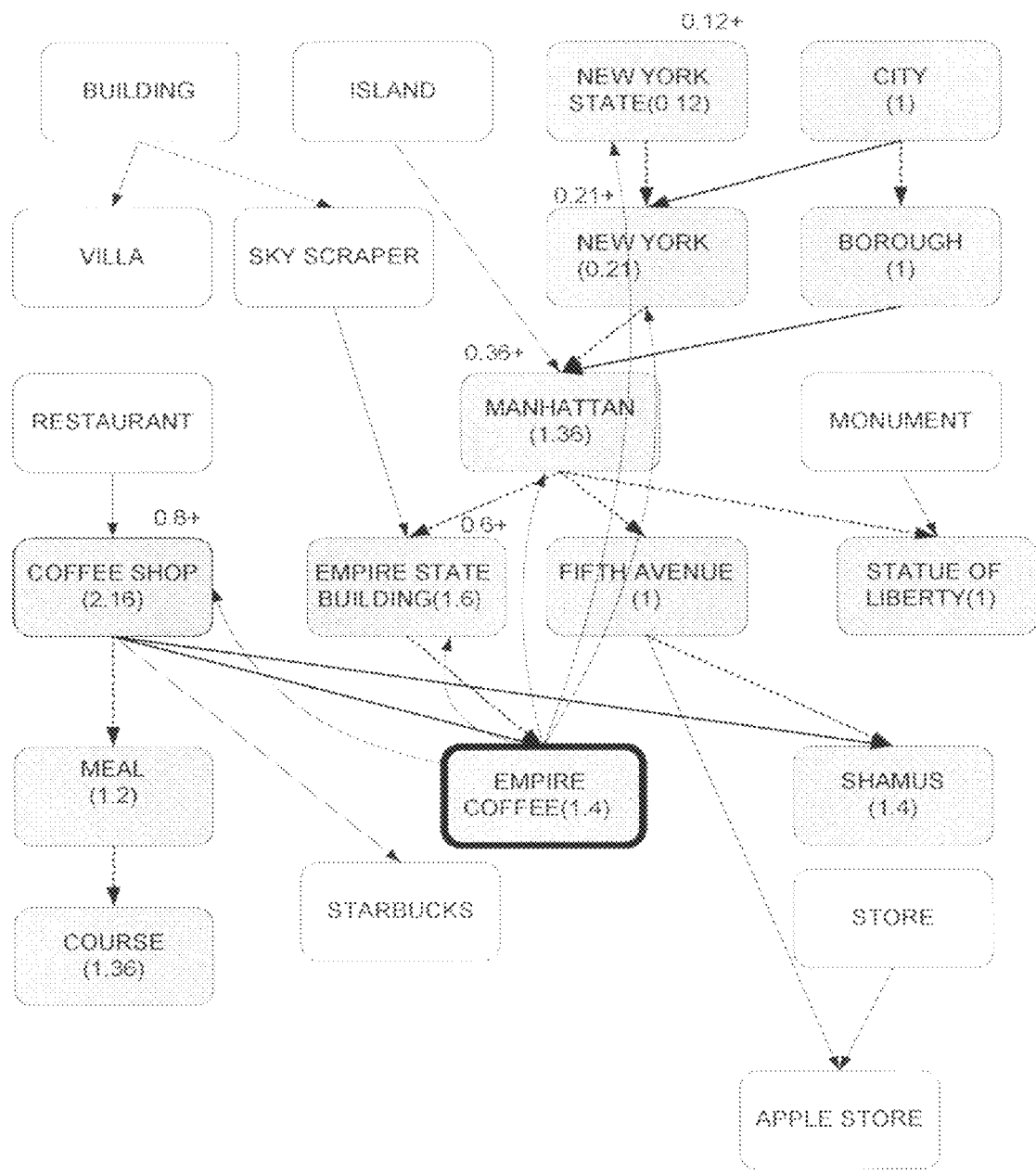
FIG. 10-G
GRADING PROCESS FOR
"EMPIRE COFFEE"

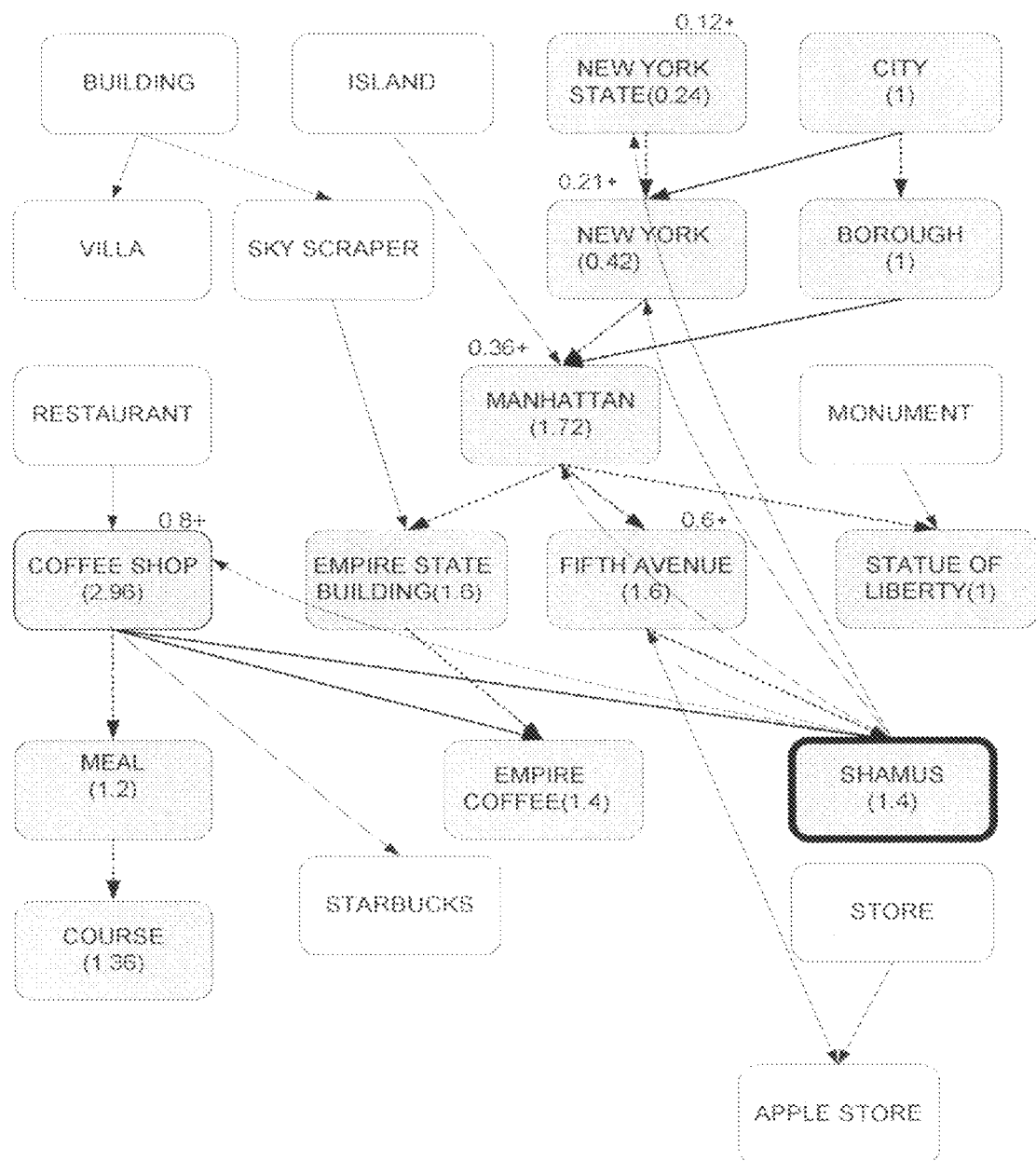
FIG. 10-H
GRADING PROCESS FOR
"SHAMUS"

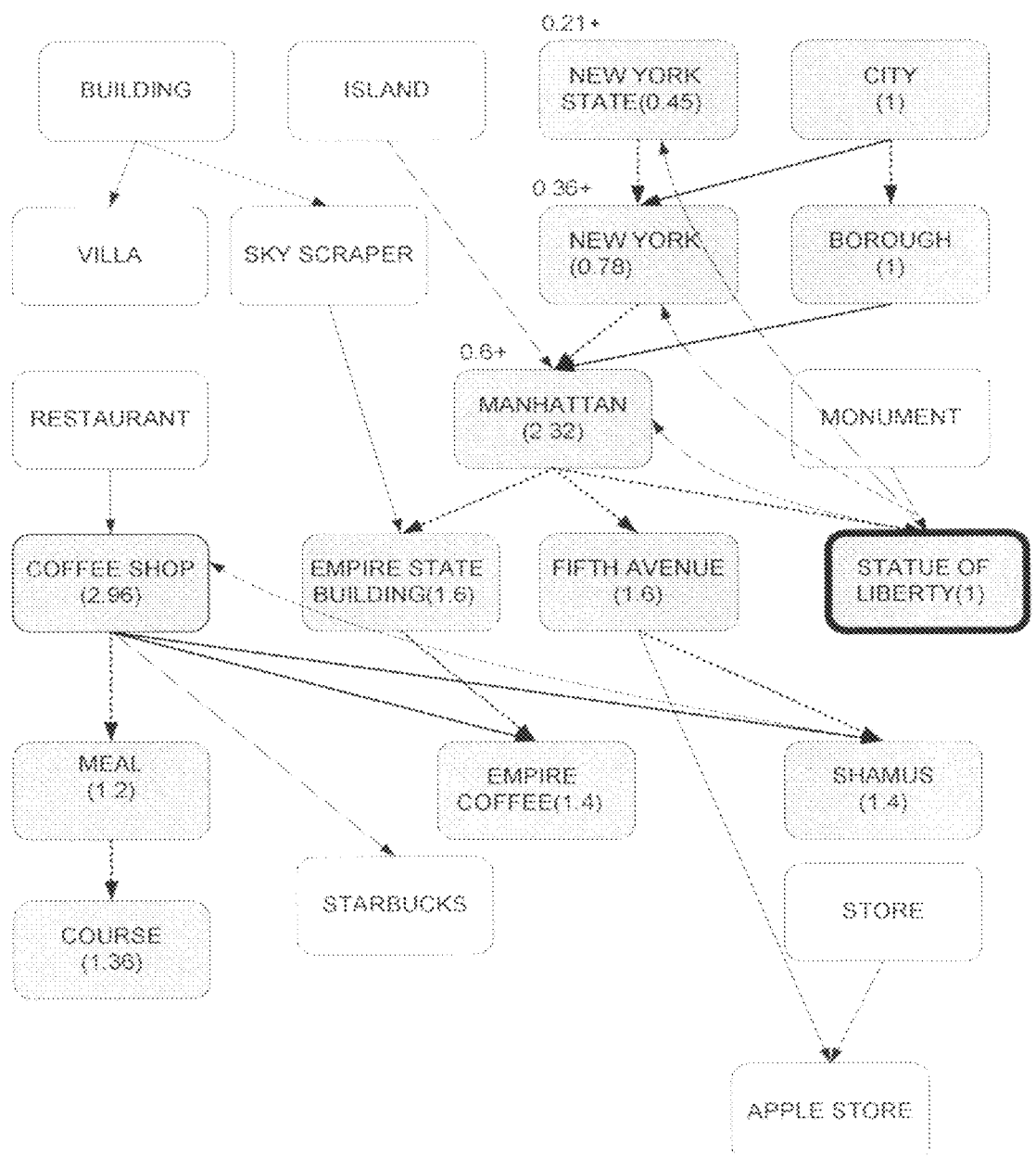
FIG. 10-I
GRADING PROCESS FOR
"STATUE OF LIBERTY"

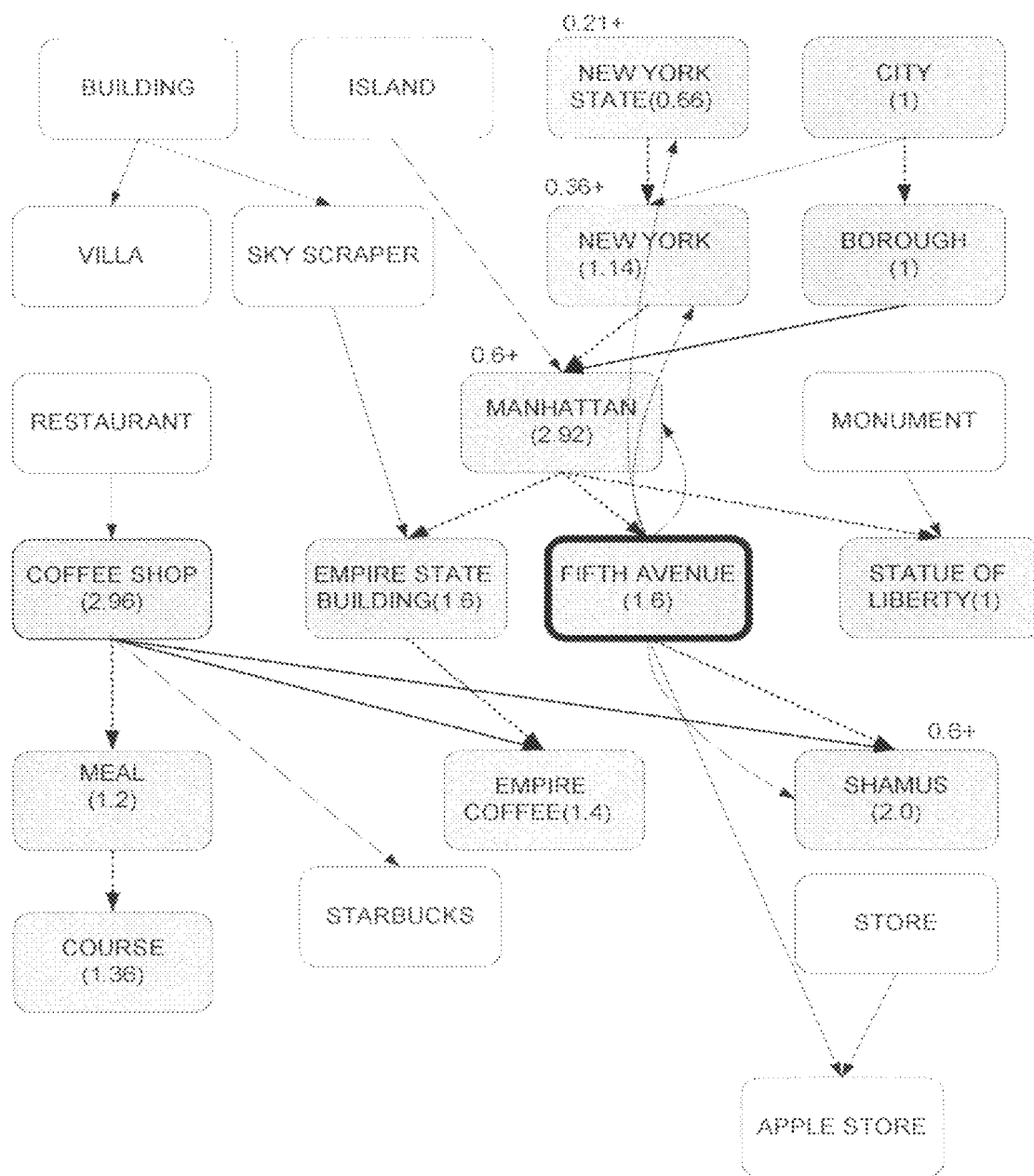
FIG. 10-J
GRADING PROCESS FOR
"FIFTH AVENUE"

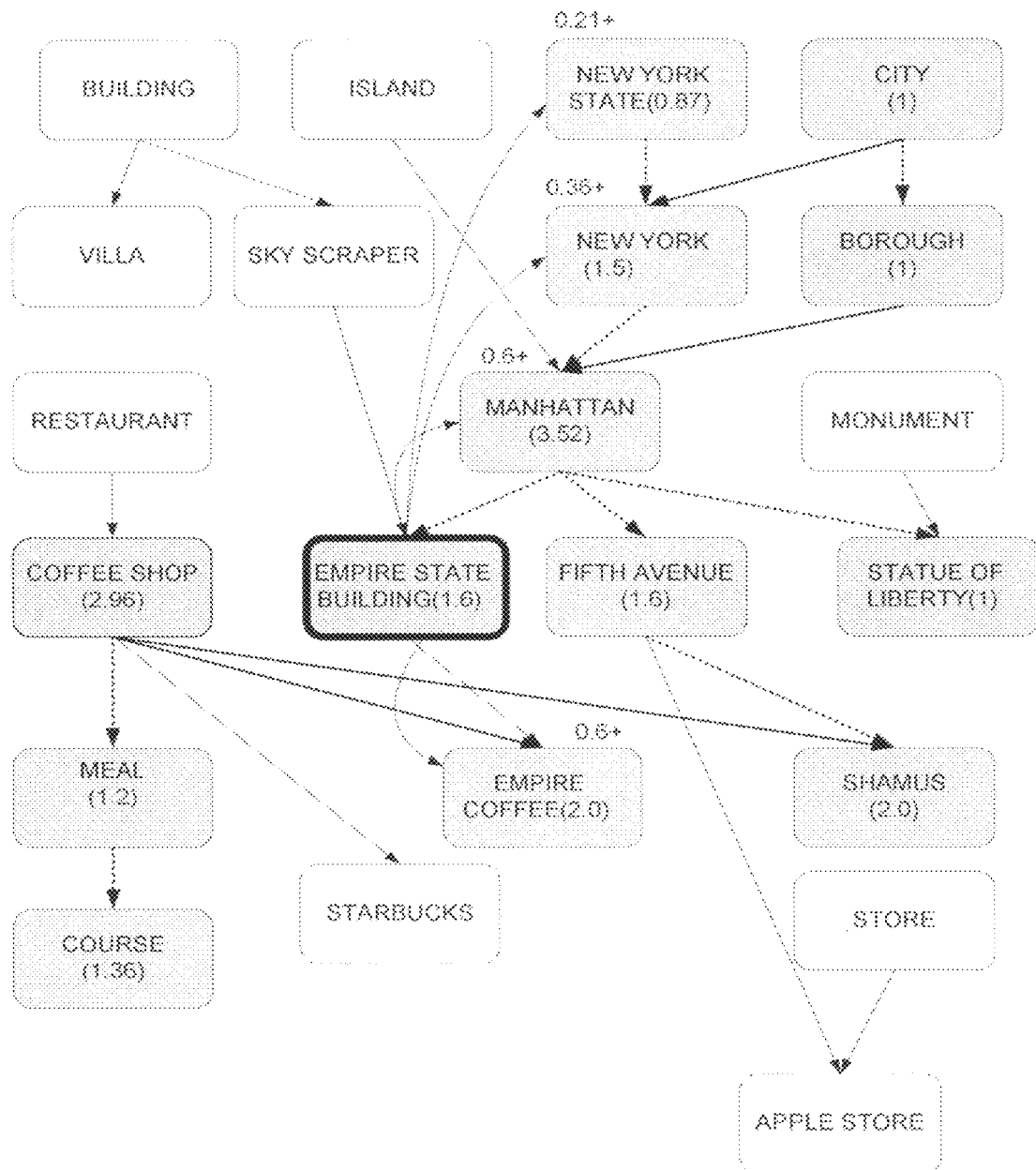
FIG. 10-K
GRADING PROCESS FOR
"EMPIRE STATE BUILDING"

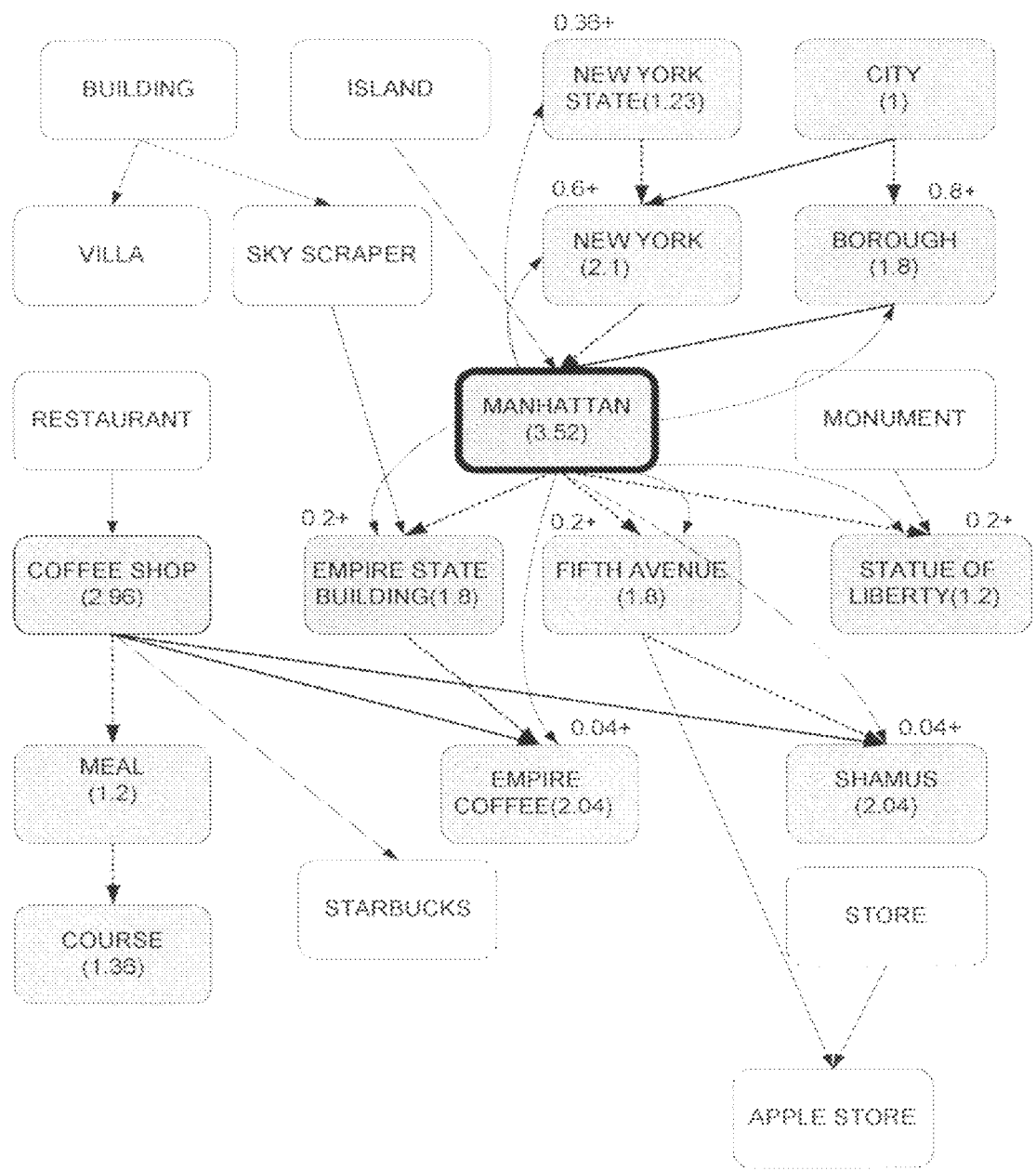
FIG. 10-L
GRADING PROCESS FOR
"MANHATTAN"

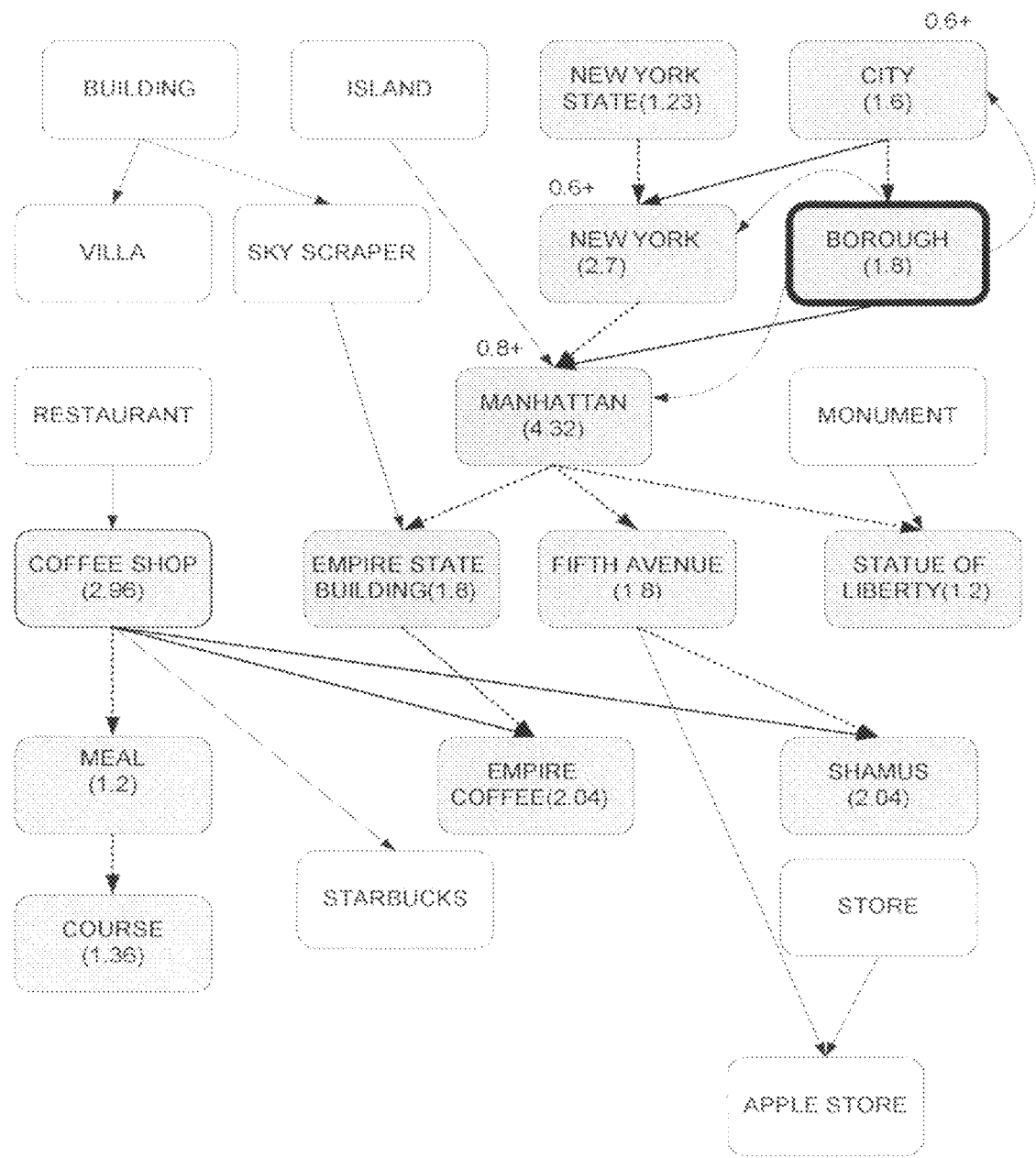
FIG. 10-M
GRADING PROCESS FOR
"BOROUGH"

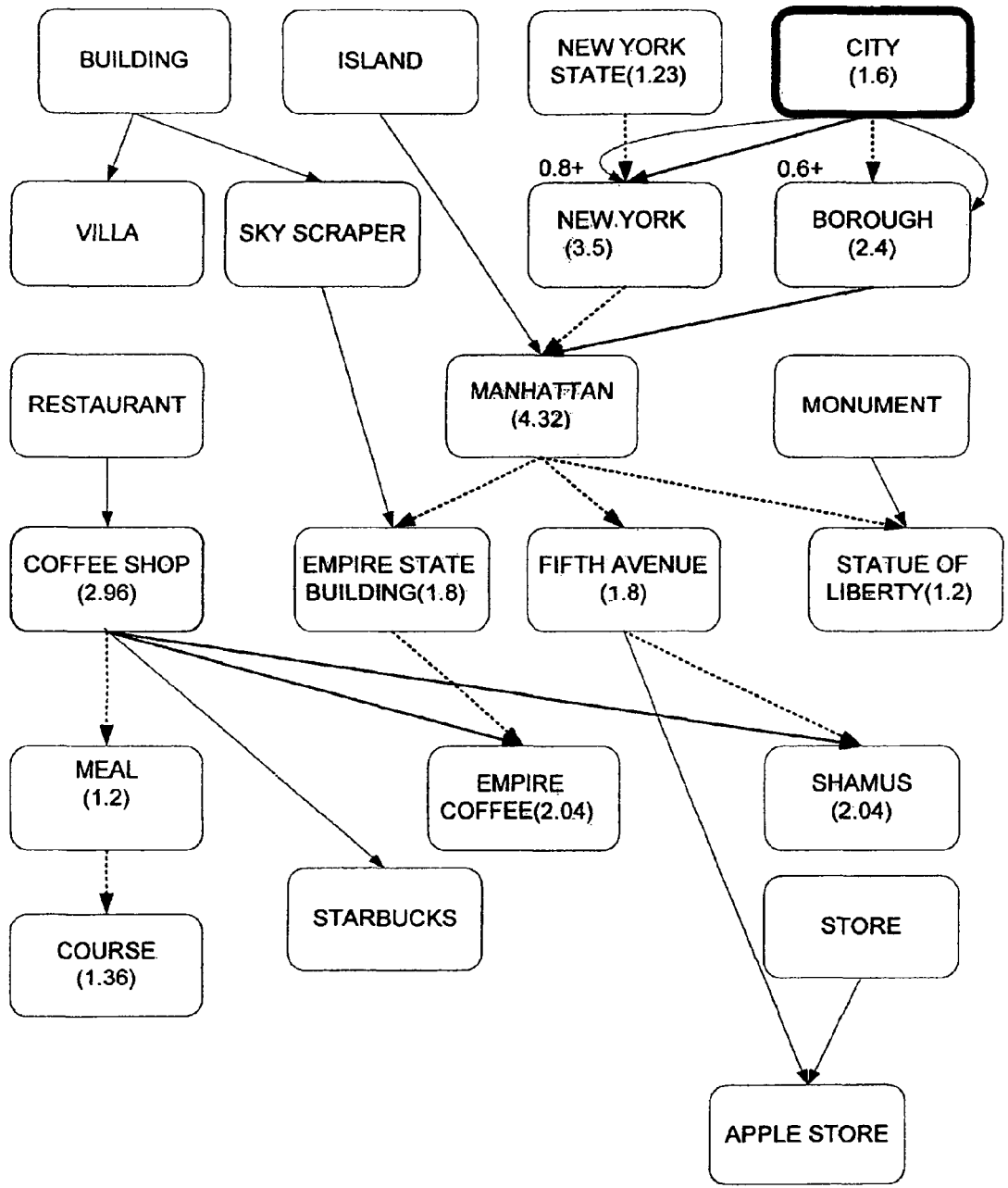
FIG. 10-N
GRADING PROCESS FOR
"CITY"

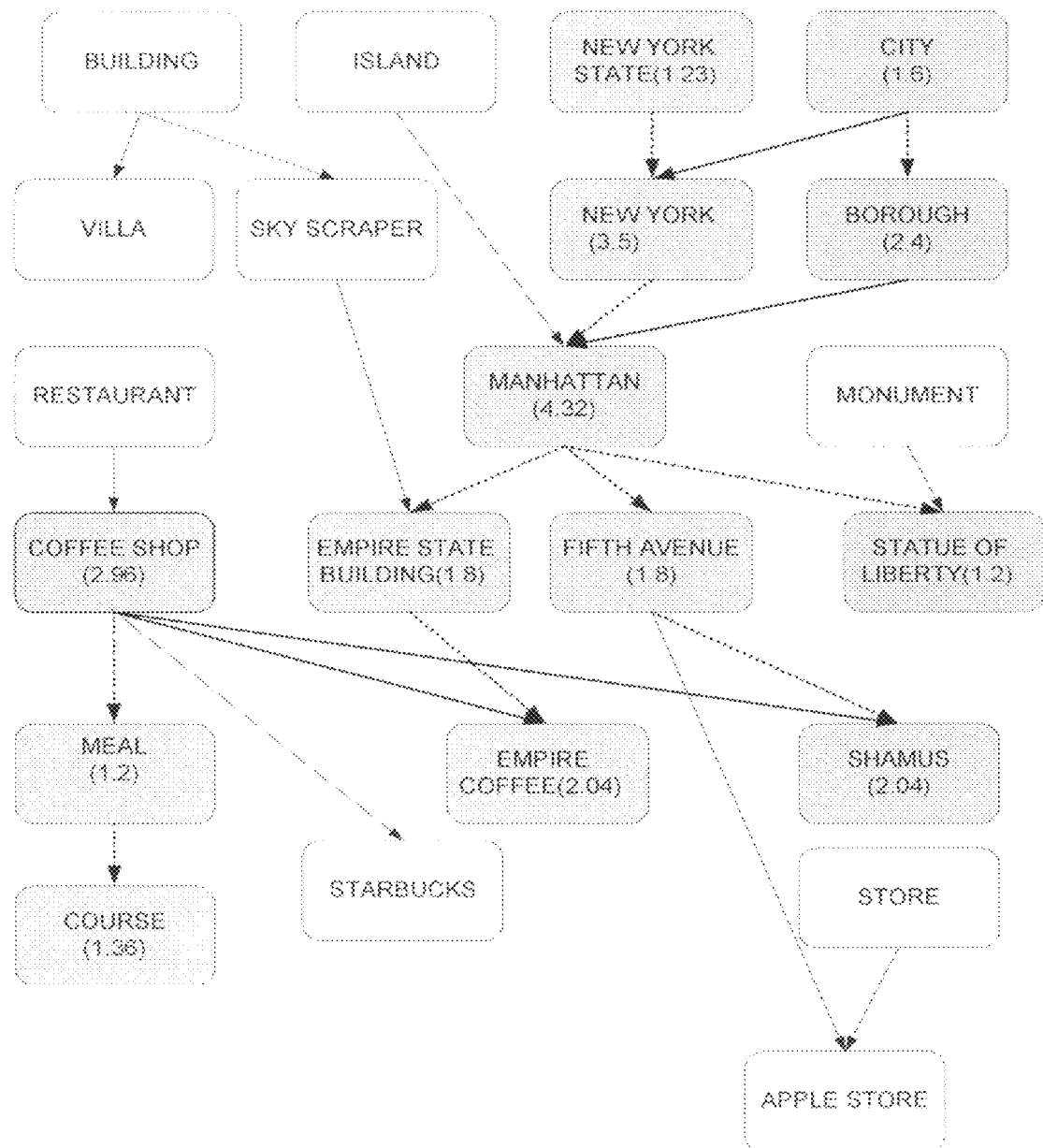
FIG. 10-O
END RESULT

SYSTEM AND METHOD FOR MATCHING SEARCH REQUESTS AND RELEVANT DATA

CROSS REFERENCE TO RELATED APPLICATIONS

This patent application claims priority from and is related to U.S. Provisional Patent Application Ser. No. 61/064,915, filed on 3 Apr. 2008, this U.S. Provisional Patent Application incorporated by reference in its entirety herein.

TECHNICAL FIELD

The present invention relates generally to computer-implemented techniques for information retrieval. More specifically, it relates to query-based search engines and methods for improved searching through the use of contextual information.

BACKGROUND OF THE INVENTION

Search engines are expected to return to users the most relevant results for their requests which are submitted in the form of search string or search query. They are also supposed to return similar documents to a reference document supplied by the user. Search engines rely on two basic traditional methods: keyword matching and Pagerank. Keyword matching is based on information collected from inside the documents (and therefore content-related) and various analytics that are applied to it. Pagerank is based on counting the references (links) to each document across the Internet (like citation count which is common in the evaluation of the importance of essays in the academic world). Other methods used by search engines are contextual advertisement (advertisement based on keywords like AdWords and AdSense), clustering, image processing, voice recognition and statistics collected and performed on the search strings. Others use grammar rules. The results suffer from various limitations, in the quantitative and qualitative aspects. These problems can be summarized as follows:

1. False positives: Among the returned results some may be relevant, while others may be only partially relevant, and the rest are irrelevant.
2. Relevant results get low relevancy score and are therefore pushed down in the result lists and frequently ignored by the user.
3. Too many results which are not ranked correctly are returned and hide the relevant results from the user.

Current search engines are usually based on "containing" criteria when matching between tags (also known as keywords or metadata) and keywords in a search list. The terms in the search keyword list, set by the searcher, are compared to the keyword sets that are associated with the object (also known as tags, or metadata). More matched words yield higher ranks. All the words usually get the same weight. In order to increase the chances of matching with a wide variety of keywords that the searcher might use, a very common practice is to add more terms to keyword lists associated with the objects. In this process, keywords with very little relevancy are added to the keyword lists that are associated with objects. As a result, ranking objects that match the same tags/keywords in the search list, based on relevancy, is impossible with search engines that are based on tags matching only. Tag matching based on the "containing" criteria is very common for images, video clips and footage.

SUMMARY OF THE INVENTION

The present invention comprises the following components:
1. Context Based Understanding Humans understand new information through interaction with existing knowledge, not as standalone pieces of information. Unlike existing techniques, external knowledge, that is not grammar rules, is being used by this invention together with content-related information which is collected from inside the docs to improve the understanding of the highlights of the doc. This basic principle is followed by:

1.1. Retrieving basic human knowledge from dictionaries, encyclopedias and classified directories and atlases (yellow pages, business directories like D&B, medicine atlases, GPS databases, . . . ). This is a preparation process, disconnected from any crawling or search operation.

1.2. Representing these basic aspects of the human knowledge in a structure of relations (Human Knowledge Structure—HKS). Two major relations are being used by the HKS: "Contain" and "Essence". "Contain" means "have within, hold, include" and we say that term 'A' in contained within term 'B' if term 'A' IS IN term 'B', e.g. Texas (term 'A') is in the USA (term 'B'). "Essence" means "core, spirit" and we say that term 'B' is the essence of term 'A' if term 'A' IS A term 'B', e.g. San Francisco (term 'A') is a city (term 'B'). This form of the human knowledge is the external knowledge that this invention is using. The HKS is built in a preparation process, disconnected from any crawling of the web or search operation.

1.3. Putting documents in the context of the Human Knowledge structure by performing the coloring process. The coloring process starts with the identification of terms and marking frequent terms from the doc with their relative or absolute frequency values (histogramic-values) on the HKS. (in a perfect world, all the terms of a doc would be marked). Then, performing the coloring function on the nodes of the HKS. The coloring process identifies terms that best describe the highlights of the doc and replaces their histogramic-value by a larger score, directly proportionate to their importance. It also identifies terms that are not part of the doc but do belong in this group, and associates them with proportionate scores. The final colored term-set contains the colored terms and terms with high histogramic-values that are not contained in the HKS. The final colored-sets are linked to their docs and saved as the terms that describe highlights of the docs. This process follows the crawling of a new doc and can be disconnected from any search operation.

1.4. Matching between a search request and the colored nodes (terms) of the different docs is done by calculating a single score per doc from the scores of the terms that are colored terms for the doc and appear in the search request, and listing the results in descending relevancy order. This process is search dependent.

2. Partial Sentence Analysis

A search query is more than just the sum of its keywords. The user gives in the search string more information than a list of keywords. "Celtics beat the Lakers" is not equivalent to "Lakers beat the Celtics". This component of the invention considers and treats the search strings as partial sentences. Matching between the user's partial sentence of the search request and equivalent forms of that sentence in the docs' sentences is done in a new way. Permutations to the partial sentence are allowed as long as its meaning is kept. Contradicting meanings and gibberish combinations are not allowed. Among other things, the present invention allows permutations in the sentences of the docs like synonyms, abbreviations, cyclic permutations, some close inflections like plural, close tenses, and some extra words among the keywords of the search request, as long as the extra words are not negative terms like 'not', antonyms or some remote inflictions like active—passive and remote tenses. Allowed permutations are accepted but penalized. In addition, this component of the invention functions as a filter, filtering out results that other search engine methods identified as relevant (like methods that are based on word histograms alone), but are in conflict with the meaning of the request.

3. 100 Percentage Points to Keyword/Tag Sets

Most images, songs, video clips and footages, as well as many text documents, contain tags that describe their content in order to help find them. Often, the owners of the content want their content to be retrieved by as many searches as possible, regardless of how relevant the content is to the search. Content owners therefore tend to tag their content with as many tags as possible. This component of the invention forces the tags to focus on the highlights of the objects that they describe and imposes relevancy levels on tags. Those who set the tags are forced to think in relevancy terms—which term is more relevant, which is less relevant and which is not relevant at all to the object. Not everything can be extremely relevant according to this methodology of the present invention, because the total number of points to be assigned to the tags is fixed and therefore one allocation can come only at the expense of others. Tags are attached to the objects in the form of a table consisting of pairs of tag and weight (weighted tag table). A part of this methodology handles the legacy reservoir, existing objects that include tags, by filtering and setting default weights to their existing keywords. A search engine using this new method and system can generate better relevancy-based scores, and thus rank the results much better according to their relevancy to the search request. Objects with weighted tag table, are colored on the HKS by first coloring all the weighted tags on the HKS, when the weights are used as the tags' (nodes') initial score. The remaining coloring process is the same as described by the coloring process component of the present invention.

In addition to the three components, the present invention contains the following:

Any combination of the three components of the present invention may enable a completely different search method which may produce higher relevancy results, more accurate ranking and much less false positives, thus the accessibility of the user to high quality results, namely relevant results, will be improved very much. Working together with other search methods like Pagerank will yield even better results.

The system of the present invention also provides advantages over current systems with its ability to rank similarities between a reference doc that the user provides and docs in the reach of the search engine. It is done by comparing the colored terms of the docs in the HKS.

The system of the present invention can be used for Internet search (searching online documents in the entire Internet, or in a selected set of sites) or site search (searching documents in a specific site like online newspaper, scientific magazine, online commerce site, social site etc.)

The system of the present invention has a significant importance for searches performed using mobile devices that have smaller screens. The limited area of the screen increases the importance of displaying the most relevant results first.

The 100 percentage points to keyword/tag sets component of the present invention has a significant importance for searching images, video clips, footage, and songs because it is very common that those are described by sets of tags or metadata, and this is the only readable text within them. Nevertheless, many articles, papers, and text documents in general are associated with keyword tags; therefore this methodology is applicable for them too.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 4 illustrates major steps in 100 percentage points to keyword/tag sets: Table definition;

FIGS. 10-A through 10-O are a graphical representation of an exemplary coloring process.

DETAILED DESCRIPTION OF PREFERRED EMBODIMENTS

Figure 1:
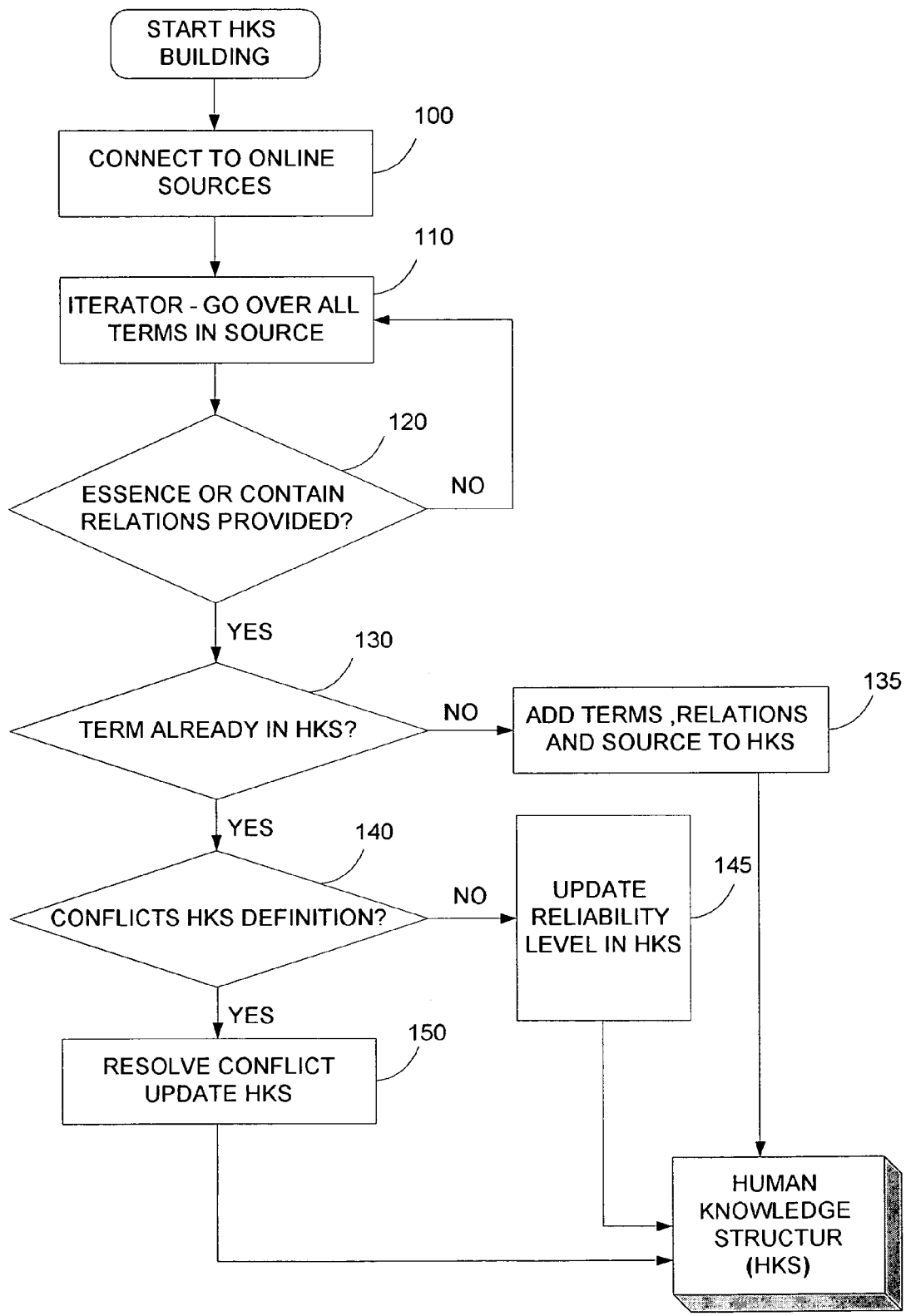
FIG. 1 illustrates major steps in Context based understanding—building and representing the human knowledge as a structure of relations.
Figure 2A:
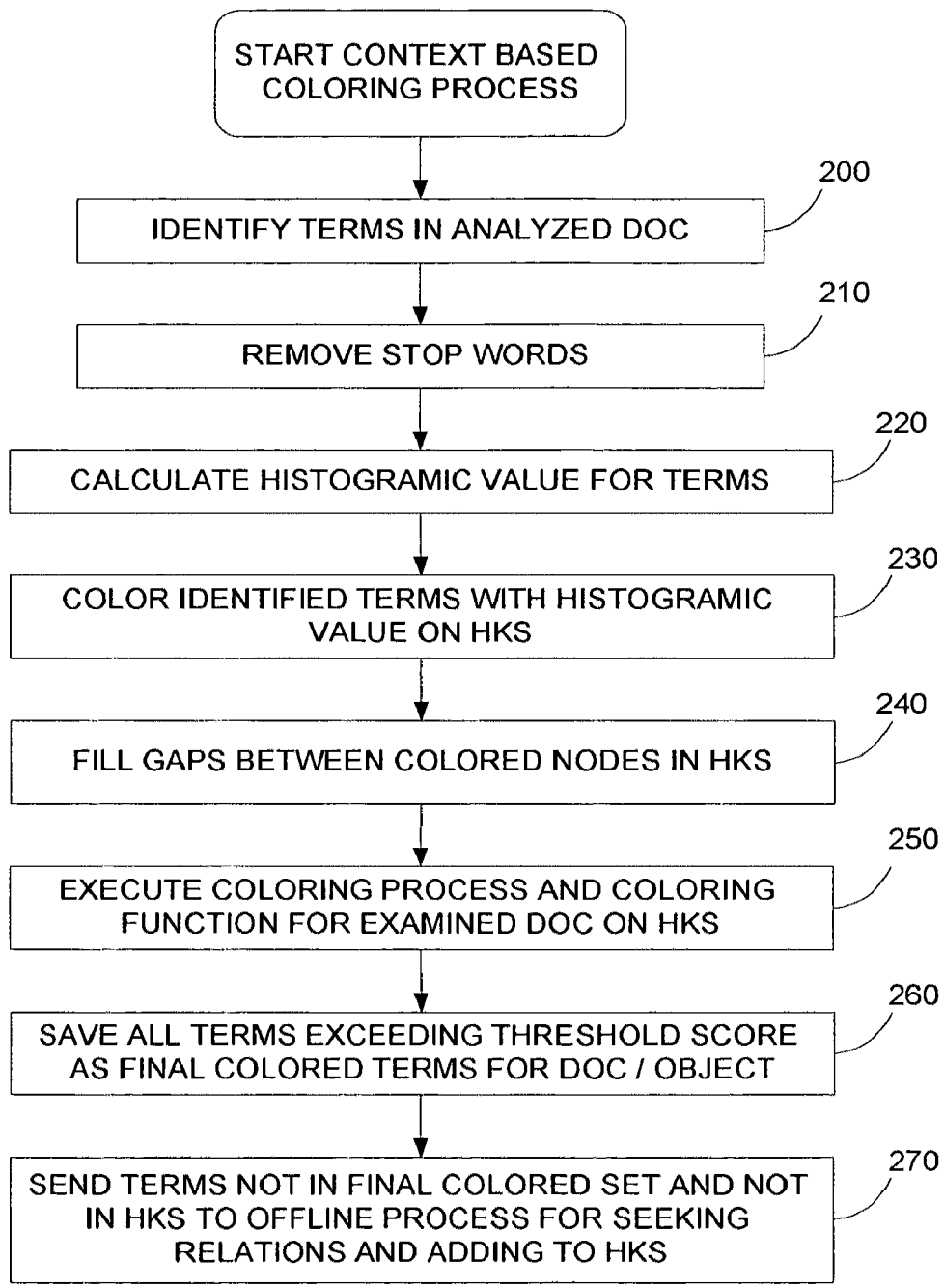
FIGS. 2A and 2B illustrates major steps in Context based understanding—coloring process and matching process
Figure 2B:
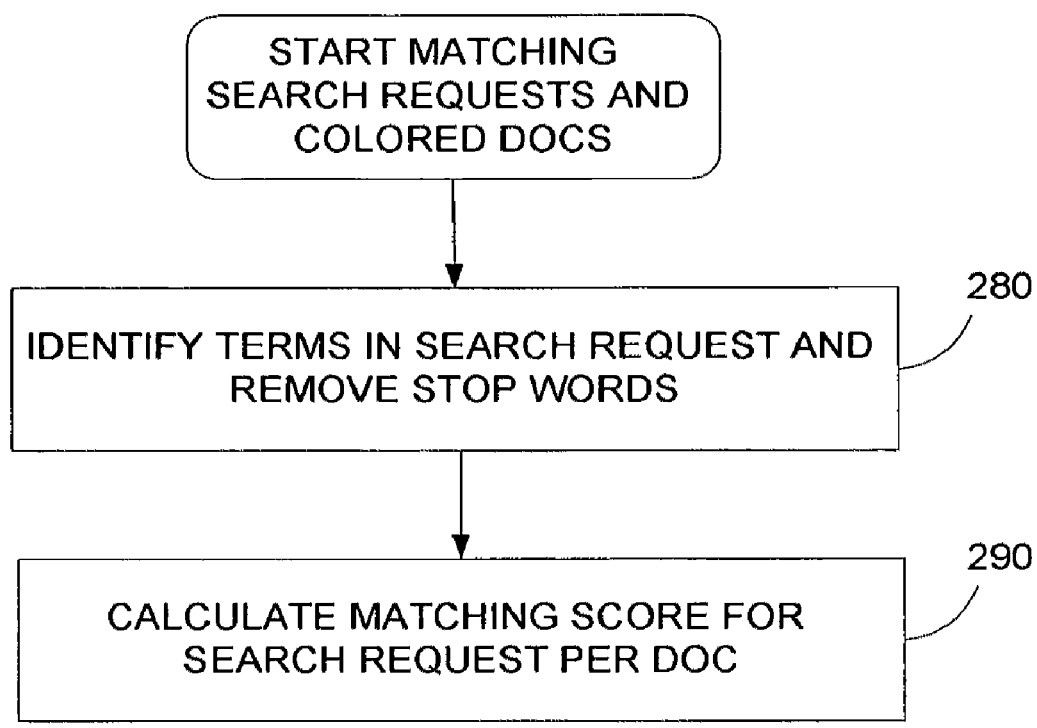
Figure 2C:
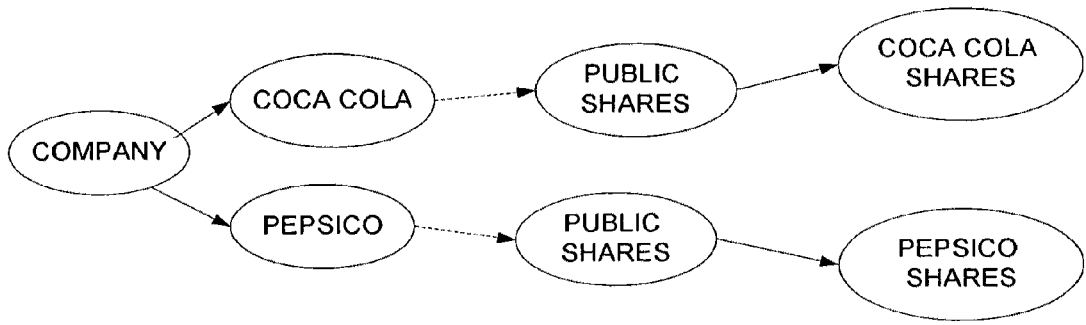
FIGS. 2C and 2D illustrate an example of the grouped relations improvement to the coloring process of the Context based understanding.
Figure 2D:
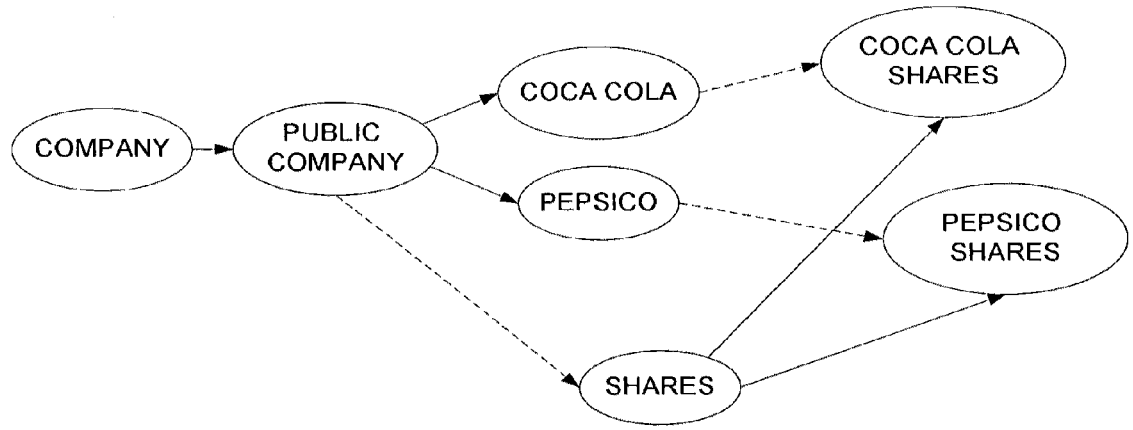

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Throughout this document, the terms "doc" "document" and "object" and their plurals, in the context of the present invention, are interchangeable and refer to all types of online documents including web pages, essays, text, documents, images, video clips, footage etc., and any combination of these entities.

The present invention provides a system and method of three components for matching between search requests and relevant data (web pages, online documents, essays, images, video, footage etc.).

The three components of the present invention are:
1. Context based understanding;
2. Partial Sentence analysis;
3. 100 percentage points to keyword/tag sets; and The components can work separately or together and can be integrated with more search engine methods like Pagerank in order to further improve the relevancy of search results. It works in both directions. When Pagerank identifies that two results are very close, the methodologies of the present invention may either give higher rank to the more relevant result, or filter out results that contradict the meaning of the search request. When the system ranks two results very closely, Pagerank can put more weight on the more popular result, and promote it on the ranking scale.

The system can find similarity between different documents and measure the relative distance of similarity between documents.

This system and methods according to the present invention add significant capabilities and functionality to the Internet, by presenting an entirely new paradigm for retrieving relevant information when searching the web. This functionality significantly extends Internet capabilities, enabling better matching between search requests and data available on the Internet. This is also true for site search. The methods as described herein below contribute to the improved overall result, either as standalone methods, or when operated with other methods. The other methods can be part of this present invention, or not.

Reference is made now to FIG. 1, which is an illustration of an embodiment of the building and representation of the Human Knowledge in a structure of terms (nodes) and relations. The Human Knowledge structure (HKS) is a major component in the context based understanding methodology of the present invention. The HKS is populated with entries that are extracted from multi-layer offline and online data containers, including: dictionaries, encyclopedias, and classified directories (like yellow pages, business directories like D&B, medicine atlas, GPS databases etc.). In case of search for terms that are not stored in the HKS, the system may issue a request to find such terms and to add them to the HKS in the future.

In step 100, one source is selected at a time and then an iterative process at step 110 goes over all the entries/terms in the source and verifies in step 120 that Essence or Contain relation among the current term and other terms is provided. If not, the system loops back to step 110 to process the next term. Otherwise, step 130 checks if the term is a new term in the HKS. If it is, the extracted term and the extracted essence and contain relations are added to the HKS in step 135. The source of the information is also recorded and stored. The HKS is built from nodes and arcs. The terms are the nodes. There are two types of arcs—Essence and Contain. The relations' type is a directed acyclic graph which is represented most efficiently. The relations do not form a tree. Each node may have many parents. The extraction of the terms (nodes) and the graph building process use the structured manner (syntax) of these sources. It requires a reliable tailored interface per source. Using multiple sources for each data type increases the reliability of the information, as well as the number of entries in the HKS. The following is an example of how Contain and Essence relations are extracted from the sources. This example does not cover all the possible ways to identify and extract this information:

"Contain" relation usually follows this pattern: Term a is in Term b (e.g. Texas is in the USA)

"Essence" relation usually follows this pattern: Term a is a Term b (e.g. San Francisco is a City)

"Essence" followed by "Contain" relation usually follows this pattern: Term a is a Term b in Term c (e.g. San Francisco is a City in the USA)

Step 140 is performed only if the current extracted term is already included in the HKS. It verifies that the extracted relations from this source do not conflict with what is already represented in the HKS. If conflict is not identified then step 145 adds the new source to the source list of the related information. This action will be used for checking the reliability of the data when needed, including when conflicts are detected or suspected in the future. In case of conflict detection, conflict resolution is performed in step 150, and the HKS is updated, and thus high reliability of the HKS is maintained and kept. Conflict resolution can be based on source reliability considerations, on majority considerations, or on human decision.

The iterative process over the current source continues till it ends. Then the system goes over to the next source. It is more effective to start with basic layers of human knowledge that can be found in dictionaries and to move to higher layers of human knowledge that can be found in encyclopedias and directories. Note: More relations can be used by the HKS. Two examples of such relations are corporation—areas of operation, and organ—functionality. Other relations can be transformed to essence or contain, like document—author when the author can contain the documents he or she wrote.

Reference is now made to FIG. 2, which is an illustration of an embodiment of the coloring process of the context based understanding methodology of the present invention. In this part the information collected from inside the examined docs together with the Human Knowledge structure (HKS) as described herein above with reference to FIG. 1 are used to color and calculate scores for terms (nodes) that describe the highlights of the doc most closely.

Coloring means giving weights to terms based on their initial condition (e.g. their relative frequency distribution or simple count) and their position and relations to other terms in the HKS. Terms that are colored more strongly are terms that receive bigger weights. Terms with bigger weights (stronger colors) have stronger correlation with the highlights of the doc. The colored terms are not necessarily contained within the doc, but they are related to the terms from the doc via the HKS, and the coloring process reveals this connection. The relevancy of a doc to a search request depends on how strongly the words in the search request are colored when the doc was analyzed against the HKS as described in FIG. 2.

The coloring process per doc begins in step 200 with terms identification. Single words and sets of consecutive words (2, 3, . . . depending on computation power) are identified . . . In step 210 stop-words (e.g. a, in, at, is . . . ) are removed. Stop word lists are published by a few sources, e.g. http://www.ranks.nl/tools/stopwords.html. Stop-words are removed after the execution of the multi-word terms identification because a stop-word can be part of such terms, like with "United States of America". In step 220 the histogramic-value of the terms is calculated. Relative frequency is usually used, but absolute frequency might be also effective in some cases. Absolute and relative frequency distributions refer to term histograms that count the number of appearances of each term in the doc. Absolute frequency simply counts the number of occurrences of each term in the doc, divided by the total occurrences of all the terms in the doc. Relative frequency is defined as the absolute frequency of a term in the doc divided by the absolute frequency of the term in the world. The reference world can span from all the available documents to documents of a specific category. Relative frequency measures how dominant a term is in the document, compared to its frequency in the world. The value associated with the terms in this step is called "Histogramic-value". (These values are normalized: usually transformed to the {0 . . . 1} range). Terms with high histogramic-values are identified and moved on to the next steps. This action is needed for efficiency reasons. In a perfect world, systems with no cost restrictions would pass on to the analytic step all the identified terms in the doc. In this step the terms with high frequency, relative or absolute frequency distribution, those that are more significant to the doc are identified and passed on. In step 230 the identified terms are marked on the HKS together with their histogramic-value. This operation is the initial coloring operation. In step 240 all the connecting nodes between colored terms are colored. Optionally, this step can also include coloring parent nodes of marked terms under certain conditions, like coloring contain or essence parents of marked nodes (coloring chains of the same relation—contain chains and essence chains). In step 250 the coloring process and the coloring function are executed. For each initially colored node, the graph is traversed and the coloring function is performed on connected nodes as described herein under. At the end of the process, in step 260, all the colored terms with scores above a threshold are saved for the examined doc. This set is named the final colored terms for the document. In a perfect world, all the terms and colored nodes would have been saved. The coloring process identifies terms that best describe the highlights of the doc and replaces their initial histogramic-value by a larger score, directly proportionate to their importance. It also identifies terms that do not appear in the doc but belong in this group, and associates them with proportionate scores. These outcomes are achieved by putting the doc in the context of the HKS.

In Step 270 (an optional step) terms within the final colored terms, with initial histogramic-value that exceed a threshold, which are not contained in the HKS, are sent to a process that accumulates these terms, and seeks for sources that provide their essence and contain relations and thus enable adding them to the next update of the HKS.

The definition of the coloring function and coloring process is as follows:

Parameters of the Coloring Function:
1. The term to be colored and its initial histogramic-value.
2. Type of connection: Essence chain, Contain chain, or cross relation chain (like: the Essence ancestors of Contain relations). Each of the chains has a direction: up or down.
3. Generation distance: the Coloring function is going upwards and downwards to ancestors and descendants. The value that a node grants in the coloring process depends on the distance between the source and the destination nodes. The distance is measured in number of generations. As the distance is bigger the effect of the coloring is weaker.
4. Competition of brother nodes: When a reference node grants points to brother nodes (nodes at the same level and same relationship, directly connected to it), the total points it grants to this level might be divided between the brother nodes that are already colored, in proportion to the centricity of these nodes in the HKS for this article. (Suppose that a doc contains the following three terms with Essence relations between them—"City", "NYC" and "LA". The initial histogramic-value of NYC is greater than that of LA, therefore the term City will grant more points to NYC, than to LA). The nodes that are connected to these brother nodes will be colored in proportion to the proportionate values the brother node got, in addition to their generation distance from the reference node.

Constants of the Coloring Function:
1. Relationship type factors for each of the types of connections, like 0.8 points per occurrence for essence relation, and 0.6 points per occurrence for contain relation.
2. Distance factor, a factor that affects the coloring so that the coloring is weaker as the distance from the source node to the destination node (the colored node) is greater, e.g. the type factor powered by the generation distance (e.g. 0.8, 0.64, 0.512 . . . ).

Note: if more relations are used, each relation is assigned with default values to the above constants.

Logic Principles of the Coloring Function:
1. The points that a node grants to the nodes it affects (colors) depend only on its initial histogramic-value, and not on any running value it has during the coloring process. The points it adds to nodes in distance greater than one, are also dependent on its histogramic-value, and not on the value of the nodes in-between.
    This principle ensures that the coloring outcome is independent of the order of the processed nodes. (Symmetry under the coloring order principle). It also ensures that nodes will not be colored against the coloring policy—like brothers affecting each other via a shared node which is connected to both of them.
2. Centricity: Centricity determines which brother node is more important and central, and how to associate numeric values to the importance of a node in the HKS for a given doc. For example: Each node gets a grade, calculated from the histogramic-values of all the nodes it is connected to, all types, and all directions, plus the nodes in generation distance 2, multiplied by a weakening factor, and so on.
3. Continuity: the function has to ensure that small changes in the input result in as small as desired changes in the output Two improvements may be made to the basic relation structure of the HKS, namely Grouped and Loose relations:

Grouped relations:
    The naive process of following the dictionaries/encyclopedias hierarchy may sometimes produce results that lead to incorrect coloring behavior. The following set of definitions may appear in the dictionaries/encyclopedias that are used to build the HKS: "Coca Cola is a Company", "Coca Cola issued and since then has public shares" and "Coca Cola share is a public share". Another such example can be created by substituting Coca Cola with PepsiCo. If these definitions create the HKS structures as illustrated in the two naive diagrams in FIG. 2C, in which Company is the essence parent of Coca Cola, which is the contain parent of Public Shares, which is in turn is the essence parent of Coca Cola Shares, then this kind of hierarchy dictates that:
    1. Coca Cola Shares would not color Coca Cola, because Coca Cola Share is the essence child of Public Shares which is the contain child of Coca Cola.
    2. Public shares would color both Coca Cola and PepsiCo because they are its contain parent.

In order to correct the above problems, the system will recognize a common denominator (called "Public Company") among some Companies and group these Companies under "Public Company" node; the essence of "Public Company" will be "Company" of course. Public Company will be the contain parent of "Public Shares" and the essence parent of "Coca Cola". "Coca Cola Shares" will be the contain child of "Coca Cola" as can be seen in the diagram in FIG. 2D. This way Coca Cola Shares would color Coca Cola since Coca Cola will be its contain parent and Public Shares will not color Coca Cola or PepsiCo because Public Shares would be the contain child of Public Company which will be the essence child of Company.

This kind of naive graph (FIG. 2C) may be built as a result of missing information in the dictionaries, encyclopedias and other sources the system derives its information from. If the sources contained a sentence such as "Coca Cola has Coca Cola shares" and no definition that implies that Coca Cola contains the general term—Public Shares, the algorithm would have built the right presentations in the HKS in the first place, and this should be the preferred solution.

Loose relations:

Not all relations have the same strength in people's minds; for instance, the national park Mt. Aspiring is located in the Otago province, in the south island of New Zealand, but if you ask most people where Mt. Aspiring is they would probably say New Zealand. In order to make the coloring algorithm consider this notion (and make the node of "Mt. Aspiring" color the node of "New Zealand" stronger) we must add a new degree of freedom called "relation strength" to the HKS.

The strength of a relation will be easily determined by dictionaries and encyclopedias, in our example for instance, some sources will associate Mt. Aspiring with Otago and some will associate it directly with New Zealand. The ratio between the number of sources of each type will produce the "relation strength" value.

The HKS structure that will be initially created by associating Mt. Aspiring with both New Zealand and Otago will create a graph in which New Zealand is both the contain parent of Otago and of Mt. Aspiring. Mt. Aspiring is also the contain child of Otago—Mt. Aspiring is both the child and the grandchild of New Zealand. We want to avoid situations in which this inconsistency in our sources would result in granting New Zealand more points than it would have been granted had the sources been unanimous in the hierarchy they define: New Zealand—Otago—Mt. Aspiring or even New Zealand—Mt. Aspiring contain chains. The coloring algorithm as described herein above would grant New Zealand more points if New Zealand got points through two channels—as a direct parent, and in addition as a grandparent. The loose relations mechanism corrects this issue by assigning "relation strength" values to arcs. This can be done in more than one way. Two alternative examples are:

1. The loose relations mechanism will severe the direct contain arc between Mt. Aspiring and New Zealand. Then it has to make Mt. Aspiring color New Zealand more strongly than it would if they were regular grandchild and grandparent. The "relation strength" of the arc between Mt. Aspiring (the child) and Otago (the parent) is directly proportionate to the number of sources that support this direct relation. (If we have 7 sources that define a contain parent to Mt. Aspiring and of these sources 4 state that Otago is the contain parent of Mt. Aspiring, then the value of the "relation strength" of the contain arc between Mt. Aspiring and Otago is 4/7.) When the coloring process calculates the points that a grandchild grants its grandparent, the contain and essence factors should be powered by the sum of the "relation strength" of the arcs between the two nodes. The same is true for coloring more remote nodes. When a node colors its direct parent, the essence and contain factors are powered by "1" and not by the "relation strength" of the arc connecting them. This mechanism can be valid for the reverse process too, when the coloring process moves downwards.

The following example demonstrates such a case where Mt. Aspiring is mentioned twice as the child of Otago and twice as the child of New Zealand. The contain arc between Mt. Aspiring and Otago therefore has a "relation strength" factor of "0.5". Mt. Aspiring has an initial value of "2". The global contain factor in his case is 0.6. When Mt. Aspiring distributes points to its contain parents, the only parent it has is Otago. Because Otago is its direct contain parent, Otago receives $2*0.6^1=1.2$ from Mt. Aspiring. Note that the "relation strength" factor here was calculated as "1" and not "0.5" because when calculating the amount of points a node gives to its direct parent or child the "relation strength" factor will always be calculated as "1". The coloring algorithm then moves to give points from Mt. Aspiring further up the contain chain and it finds New Zealand. Mt. Aspiring gives New Zealand $2*0.6^{1.5}=0.929$ points. Note that the "contain global factor" was raised here by the power of 1.5 because the sum of the "relation strength" factors of all the contain arches leading from Mt. Aspiring to New Zealand is 1.5. Without the "relation strength" factor, New Zealand would have received $2*0.6^2=0.72$ from Mt. Aspiring. Note that Mt. Aspiring only colored New Zealand once and not twice as it would have done without the loose relations correction. Without the loose relations correction, New Zealand would have received $2*0.6$ (because it was Mt. Aspiring's "contain parent")+ $2*0.6^2=1.92$.

2. Alternatively, the loose relations can leave the arcs as-is. The grandparent would be colored twice in this case. Once, directly as the direct parent when the contain and essence factors are multiplied by the loose relations factor for this arc, and then indirectly, as its grandparent—in the regular way. The second parent (which is not its grandparent node) is colored when the contain and essence factors are not multiplied by the loose relations factor. The coloring process should verify that the grandparent never gets more points than it would get if it were the regular direct parent. This mechanism can also be valid for the reverse process, when the coloring process moves downwards. This mechanism contains more information, and requires more degrees of freedom.

Notes: (i) Important parts of a document may be treated differently. The terms of the header or the abstract of a doc can be all initially colored on the HKS, with higher weights than their histogramic-values, to reflect their importance and high relevancy to the doc's highlights. (ii) Different Histograms (relative frequency or absolute frequency) may be used in different parts of the document.; (iii) If more relations are used, each additional relation is treated as "essence" or "contain" relation, when default constant values are set to it.

EXAMPLE

Terms in the HKS are in Bold. Stop
Words are ~~strike through~~

The example is graphically illustrated in FIGS. 10-A through 10-O.

"There ~~are~~ two coffee chops ~~in~~ Manhattan ~~I'd~~ like ~~to~~ recommend. ~~The~~ first, Empire Coffee, ~~is~~ located ~~on~~ top of the the Empire State Building and it offers great views of the city all the way to the Statue of Liberty. The second, Shamus, is placed in the Fifth Avenue and itguaranties the best menu in the borough."

Histogramic-values for the example are as follows(Initially, all values are 1):

| Two | 1 | City | 1 |
|---|---|---|---|
| Coffee Shop | 1 | Guarantee | 1 |
| Like | 1 | All | 1 |
| Manhattan | 1 | Way | 1 |
| Recommend | 1 | Statue of Liberty | 1 |
| First | 1 | Second | 1 |
| Top | 1 | Shamus | 1 |
| Empire Coffee | 1 | Fifth Avenue | 1 |
| Located | 1 | Best | 1 |
| Empire State | 1 | Menu | 1 |
| Building | | Borough | 1 |
| Offer | 1 | Placed | 1 |
| Great | 1 | | |
| View | 1 | | |

For simplicity we marked up only predecessors of Contain relations (and not predecessors of Essence relations) in this example.

Assume that the score for an "Essence" relation is 0.8 and the score for a "Contain" relation is 0.6. The scores are powered for each generation between the source and the target. Practically only 2-3 generations should be colored.

"Shamus" grants the "Fifth Avenue" 0.6 points per occurrence because it is its "contain" child "Shamus" grants "Manhattan" 0.36 points per occurrence because it is its "Contain" grandchild, and so on . . .

"Shamus" also grants "Coffee Shop" 0.8 points per occurrence because it's its "Essence" child "Borough" grants "City" 0.6 points per occurrence because it's its "Contain" child "Borough" also grants "New York" 0.6 points per occurrence because "New York" Essence is "City", and "City" contains "Borough".

"Coffee Shop" divides its 0.8 points to "Shamus" and "Empire Coffee" equally, because they both have the same significance in the articles' hierarchy.

The Term "New York" doesn't even appear in the document yet it receives a high ranking of 3.5, due to using the HKS.

At the end of the coloring process the term histogram is as following:

| Two | 1 | City | 1.6 |
|---|---|---|---|
| Coffee Shop | 2.96 | Guarantee | 1 |
| Like | 1 | All | 1 |
| Manhattan | 4.32 | Way | 1 |
| Recommend | 1 | Statue of Liberty | 1.2 |
| First | 1 | Second | 1 |
| Called | 1 | Shamus | 2.04 |
| Empire Coffee | 2.04 | Fifth Avenue | 1.8 |
| Located | 1 | Best | 1 |
| Empire State | 1.8 | Menu | 1 |
| Building | | Borough | 2.4 |
| Offer | 1 | Placed | 1 |
| Great | 1 | | |
| View | 1 | | |

The entire process of FIG. 2 up to this point can be performed in advance, disconnected from any search operation. The result is stored in data structures linked to every processed online doc. It can be done immediately after crawling new docs, by any process, and as a result of any trigger. Alternatively or additionally It can be performed on documents that are returned by another search engine that the present system and method is integrated with, and is operated as a pre-process of the present method.

The coloring process is not related to a search request. It relates to the doc, and to its HKS context. Therefore the coloring process can be prepared in advance, before search requests are made.

The next process is the matching process, matching between search requests and colored docs. The matching process is triggered by search requests, and therefore executed online by the search engine. In step 280 terms are identified in the search request and then stop words are removed. This step is similar to steps 200 and 210 which are executed on the doc. Optionally, at this step synonyms to identified terms may also be used. Step 290 is the matching step. It matches between the search request and the docs covered by the system. Matching between the two is done by weighting the scores of the final colored terms in 260, for the terms in 280. The relevancy ranking of docs directly follows this weighting score. The following is an example for such a weighting function:

The final score of a document is the geometrical average ($\sqrt[n]{\alpha_1.\alpha_2...\alpha_n}$) of the scores of its relevant terms—the terms that appear in the search string ($\alpha_1. \alpha_2, \ldots \alpha_n$).

This method prefers balance between the scores of the relevant terms as portrayed in the following example, when searching for: Quantum Relativity:

| Document 1 | | Document 2 | |
|---|---|---|---|
| Quantum | 3 | Quantum | 1 |
| Relativity | 3 | Relativity | 6 |
| Final Score | 3 | Final Score | 2.4 |

Note: The system of the present invention also provides methodology to rank similarities between a reference document that the user provides and documents in the reach of the search engine. It is done by comparing the final colored terms of the reference document to the final colored terms of the other documents. The simplest method is to extract the colored terms with the highest values from the reference doc, generate a search string from them, and continue with the process as described in conjunction with FIG. 2 at step 280, after the removal of stop words. Another method would calculate the dot product (also known as the scalar product) of vectors to determine the distance between two vectors in 'n' Euclidean space. Each final colored set is mapped to a vector where each term is represented by an axis and the normalized weight for each term is represented by the value assigned to that axis. The norm of all the vectors will be normalized to one. One of the vectors is always the vector mapped from the final colored terms of the reference document and the other is of a checked document. The measured distance between two vectors in this multi Euclidean space is the cosine of the angle between the two vectors. This process will find the closest documents among the documents in the reach of the search engine to a reference document and rank them by relevancy measured in distance order units. The vectors can be mapped from a subset of the terms in the final color set, those with the highest values.

Figure 3A:
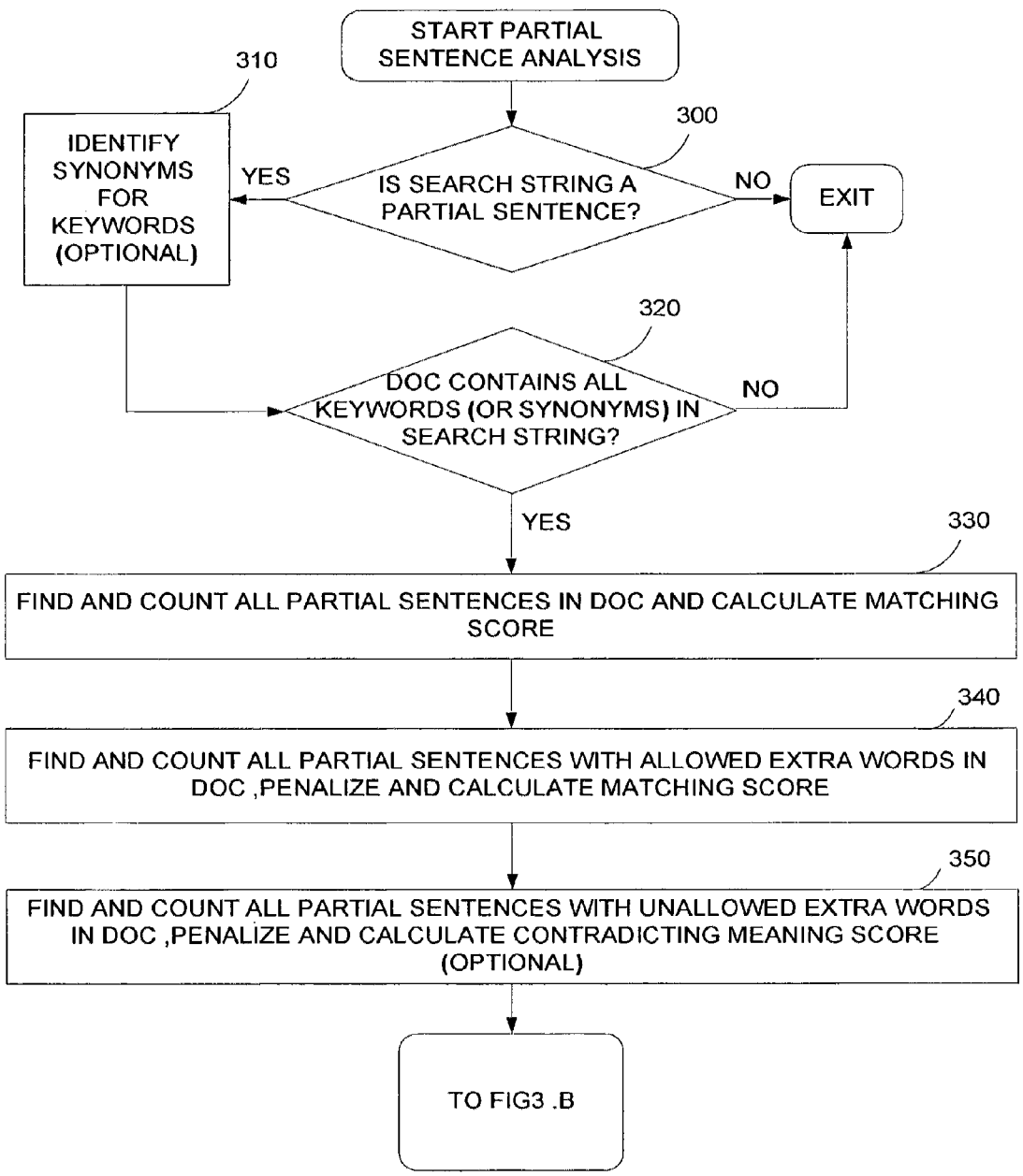
FIG. 3 illustrates major steps in Partial Sentence analysis.
Figure 3B:
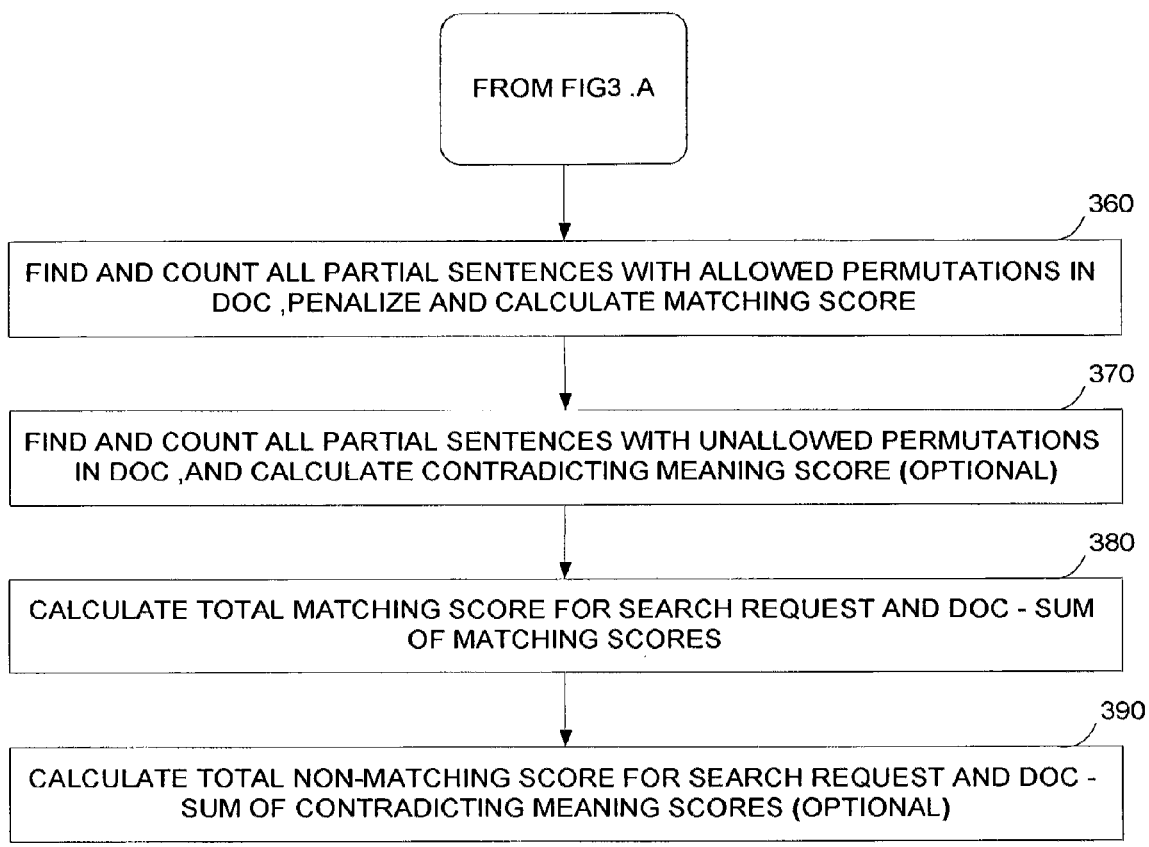

Reference is now made to FIG. 3, a schematic overview illustration of an embodiment of the Partial Sentence analysis methodology of the present invention. This methodology is applied on a per doc basis. In step 300 the process determines whether the search string is a partial sentence. A partial sentence is a collection of two words or more that contains more than just nouns. In this step, search strings that are not partial sentences are filtered out, and are not processed any further by this methodology. In step 310 equivalent partial sentences that contain synonyms and abbreviations to keywords in the original search string are optionally built by the system. The system then searches for all the equivalent search strings in addition to the original one. For simplicity the term "partial sentence" refers to all these partial sentences. In step 320 documents that do not contain all the terms that are in the search request (or their synonyms) are filtered out. In step 330 all the appearances of the partial sentence in sentences of the examined doc are found, counted and graded. If the partial sentence appears, but with a full stop in the middle, it means that it is split between two sentences, and therefore does not comply with the requirements of this step and is not counted by it.

From this point on, the system continues to calculate two sets of scores for two different purposes: The first set accumulates points of partial sentences that meet the search request, as described herein above and under. The second set accumulates points of partial sentences with changes or permutations that contradict the meaning of the search string as described herein under. This optional score can be used later to filter out false positive matches that other methodologies have identified.

In step 340 all the appearances of the partial sentence with allowed extra words among them are found in the examined doc, counted, and graded. The grade at this step includes penalty for not being an exact match with the search request. Extra words that are not allowed among the search request keywords are: Negative words (No, Not . . . ), antonyms of the searched words, and remote inflections (active/passive). In step 350 all the appearances of the partial sentence with not allowed extra words among them as defined in step 340, are found in the examined doc, counted, and graded in the second scoring set. This is an optional step, used for filtering out false positive matches of other methodologies. In step 360 all the appearances of allowed permutations of the partial sentence are found in the examined doc, counted, and graded. The grade at this step includes penalty for not being an exact match to the search request. Allowed permutations are cyclic permutations, some close inflections like plural, close tenses, and some extra words among the keywords of the search request, as long as the extra words are not negative terms like 'not', antonyms or some remote inflections like active—passive and remote tenses. In step 370 all the appearances of the partial sentence with not allowed permutations as defined in step 360, are found in the examined doc, counted, and graded in the second scoring set. This is an optional step. In step 380 the total matching score for the examined document with the search request is calculated by summing up the scores of steps 330, 340, and 360. The total score of a doc as calculated in this step is the accumulated sum of the scores of all its acceptable partial sentences. The score is directly proportional to the number of occurrences: the more the partial sentence appears in the document the higher the score is. The closer the matching sentences in the doc to the search string, the higher the score is, due to penalizing permutations (like extra words and order of words). The system might also penalize synonyms by granting them a smaller score than to the original term. In step 390 the total "contradicting (or conflicting) meaning score" for the examined document with the search request is calculated by summing up the scores of steps 350, and 370. This type of calculation dictates that change or permutation of the partial sentence is allowed unless it contradicts the meaning of the search request. This is an optional score that can be used to filter out docs that other methods identified as relevant, like methods that use simple word histogram, and accept the opposite meaning of the search request.

Notes: (i) Different weights can be associated with different parts of the text: Header, Abstract, keywords and the body of the doc. (ii) Histograms of relative frequency or absolute frequency can be used in the different parts of the document.

EXAMPLES

The following is a search request for the examples below: "Celtics beat Lakers in Finals".
1. The following sentences will be accepted:
    1.1. "Celtics beat Los Angeles Lakers in Finals"—Extra words between the searched words
    1.2. "Celtics sweep Lakers in Finals"—Synonym
    1.3. "A huge drama in NBA finals—Celtics beat the Lakers"—A cyclic permutation with extra word.
2. The following sentences will not be accepted:
    2.1. "Lakers beat Celtics in Finals"—Not a cyclic permutation.
    2.2. "Celtics beat the Suns. The Lakers awaits in Finals"—Not in the same sentence. The full stop separates the text to two sentences.
    2.3. "Celtics didn't beat Lakers in Finals"—Negative.
    2.4. "Celtics lost against Lakers in Finals"—Antonym (Loose≠Beat) and extra word.

Reference is now made to FIG. 4 which is a schematic overview illustration of an embodiment of the data structure of the "100 percentage points to keyword/tag sets" method of the present invention (the weighted tags table). This method defines weight setting to keywords in sets of keywords or tags that are used as metadata to describe the highlights of objects including images, video clips, footage, songs, articles, papers, and text documents in general. These weighted sets of keywords are used to match between search strings and relevant tagged objects. It can also be used for finding close matches (relevant matches) to reference objects, and to ranking close matches by relevancy. The "100 percentage points to keyword./tag sets" method of the present invention forces the tags to focus on the highlights of the objects they describe and imposes relevancy levels on tags. The entity that attaches the tags to an object (a human or an automated process) has a total of 100 percentage points to distribute to all the keywords (or tags). The importance of each keyword is directly proportionate to the percentage points it got. A certain shortage is created to make the associated keywords group more focused. This shortage follows reality, which in the case of images is very obvious to humans: Humans see a picture as a whole. In general, details come one at the expense of the others. It is impossible to add more and more details, and at the same time keep the subject of the picture unchanged. On the one hand, those who set the tags are forced to think relevancy—which term is more relevant, which is less, and which is not relevant at all. Not everything can be extremely relevant when this methodology is in use, because the total number of points that can be assigned to the entire tags set is fixed and therefore one allocation can only come at the expense of others. On the other hand, a search engine using this new method and system can generate better relevancy-based scores, and thus rank the results much better according to their relevancy to the search request.

The illustration of weighted tags/tag table definition 400 defines the structure of a new tag system representation, which is comprised of two components: terms and weights. The weights of all the lines have to sum-up to the predefined total weight per object. The default is 100 percentage points, but in case an object does contain a lot of details and more keywords are needed, the system might (optionally) allow to sum the weights to more than a 100 points (the total quota), based on the number of associated keywords and the principle of diminishing marginal points. For example:
Up to 20 Keywords—100 points.
21-25 keywords—add 4 points to the total per keyword.
26-35: add 2.5 points per keyword
And so on, where the principle is diminishing marginal points.
The herein above is an example of the principle and other rules may be applied to add weight above 100 points.

An entry in the table can be one of the following types: 410 define a simple entry: A term and its weight, where a term may consist of one or more words. 420 is a definition of the second type, where a term and a sub-term are considered one entry. In case a term consists of two keywords or more, the entry can be defined as a string of these keywords followed by "||" (a logical "or"), followed by a subset of this string. This representation supports cases in which the term is specific, a private case, but if the searcher is looking for a more general idea, this characteristic of the objects matches the general idea exactly the same. The following example illustrates the usage of this definition: "Orange juice || Juice". "Orange juice" is definitely not an Orange. If someone is looking for an orange, orange juice would be considered false positive. On the other hand, "Orange juice" meets the more general search term "Juice" perfectly. 430 is a definition of the third type when an entry is comprised of synonyms. The synonym terms are separated by "||", a logical or. Each of the synonyms gets the weight of the entry.

Notes: (i) The system may include a component to assist users with the distribution of the percentage points and to guarantee a sum of exactly 100%; (ii) The system may prompt the user when synonyms are being added.

Example of Guidelines for Tags Grading Criteria:
1. Subject—keywords that belong in the subject of the object should be in the highest percentage level. Pay attention to two-word keywords like "orange juice". They should be paired; they are not two different items. If I'm looking for an "Orange" I don't expect to get orange juice. On the other hand, if I'm looking for "juice", orange juice should be perfectly fine and get the percentage points for that keyword.
2. Geographic locations—keywords with small weight, but this small weight is not measured against heavy keywords. Their importance is in preventing penalty due to not matching one of the keywords in the search request. Ask yourself—will someone search for "Fiji" alone? If not, then this rule is valid. On the other hand, maybe in geographical/landscape catalogs, the geographical location should get higher weight.
3. Secondary subjects should be on the second-high percentage level.
4. Description/mood belong in the third level, and subject to positioning considerations.
   4.1. Examples for "description": "night shot", "portrait", "landscape", "studio shot". Lighting conditions too: "Natural only", "Reflectors", "Flash/flashes", "Studio lighting".
   4.2. Examples for "Image mood" vocabulary: romantic, funny, eye contact, serious, thinking, etc.
5. The guideline rules depend on the object's category. Different guideline rules should be used for different category. For example: Adjectives that describe mood or emotions should get higher weight in abstract image category than in nature category.

A few examples will illustrate this relevancy awareness of keyword association to an object and how it forces the one who sets the weights to think relevancy: what is more important, what is less important, and what is not important, or even irrelevant.

Image 1: Coconut palms in Fiji

| | |
|---|---|
| Beach | 25% |
| Tropical | 25% |
| Coconut tree || Coconut | 10% |
| Island | 10% |
| White sand || Sand | 15% |
| Day time | 1% |
| Paradise | 2% |
| Travel | 1% |
| Holliday | 1% |
| Ocean | 1% |
| Nobody | 1% |
| Outdoor | 1% |
| Fiji | 2% |
| Melanesia | 1% |
| Pacific | 1% |
| Blue sky | 1% |
| Shades | 2% |
| | 100.00% |

Image 2: Orange juice in a glass from high angle

| | |
|---|---|
| Orange juice || Juice | 80% |
| Glass | 17% |
| Studio | 1% |
| Nobody | 1% |
| High angle view | 1% |
| | 100.00% |

Should the words "beverage" and "refreshment" be added to the keyword list, what weight should they get and at the expense of what? This is a positioning issue. It depends on the purpose of publishing this image, and on what one thinks the searchers will be using to express what they're searching for. On the other hand, the methodology of context based understanding herein above will help matching this more limited set of keywords to a larger set of keywords in search requests.

Image 3: Woman wearing red hat

| | |
|---|---|
| Red hat || Hat | 72% |
| Woman | 20% |
| Wearing | 1% |
| Studio | 1% |
| Head shoulders | 2% |
| Fashion | 1% |
| Smiling | 2% |
| Caucasian | 1% |
| | 100.00% |

Should "red Lipstick" be added to the keyword list, what weight should it get and at the expense of what? Is it important enough? The answer is the same as before. Dealing with this kind of dilemmas is an outcome of the present invention.

Figure 5:
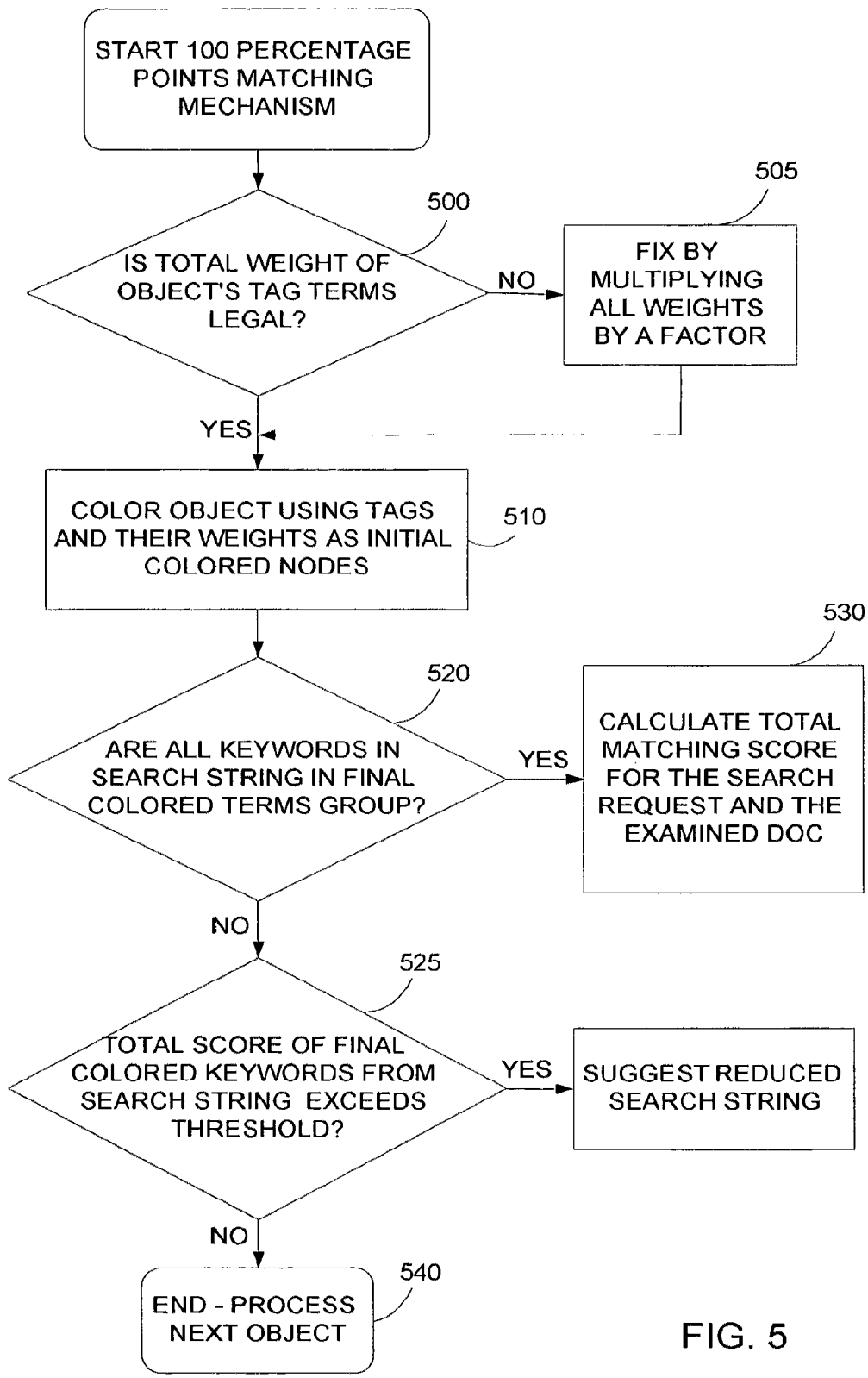
FIG. 5 illustrates major steps in 100 percentage points to keyword/tag sets—Matching mechanism.

Reference is now made to FIG. 5 which is a schematic overview illustration of an embodiment of the matching mechanism of the "100 percentage points to keyword/tag sets" method of the present invention. This method uses the weighted sets of keywords that are defined in FIG. 4 to match between search strings and relevant tagged objects. It can also be used for finding close matches (relevant matches) to reference objects, and to rank close matches by relevancy. Step 500 checks if the sum of the percentage points for all the keywords of a doc's tag set equals to the defined total quota. If not, the system in step 505 multiples all the associated points for all the keywords by a fixed factor that will fix the sum. Step 510 is part of the coloring process as defined in FIG. 2 herein, modified to be applied to objects with weighted tags table. Part of it is performed offline, before the process of FIG. 5 is invoked, as described in FIG. 2. Instead of operating the coloring process on the high frequency terms with their histogramic-values as defined in steps 200-220 and 260 of FIG. 2, the tags from the weighted tags table with their weights (400 in FIG. 4) are initially colored on the HKS. The rest of the coloring processes remain as defined in FIG. 2 herein above. Step 520 checks if all the keywords in the search string are in the final colored terms group (the highlights of the object). At this point, synonyms can be optionally accepted. They can be scored later with or without penalty. If not all the keywords in the search string are in the final colored set, in step 525 the system optionally checks if the total score of the subset keywords from the search request that are in the final set exceeds a given threshold. If yes, in step 535 the system may optionally add this object to a list of objects that have the same subset of keywords from the search string. See note (i) below. These lists may be used at a later stage for presenting to users alternative reduced sets of search keywords in order to get more results. If in step 525 the system determines that the total score of the subset keywords from the search request that are in the final set does not exceed a given threshold, the process is terminated for the current term and the system proceeds to process the next term in step 540.

If all the keywords in the search string are in the final colored terms (the highlights of the object), or if the alternative weaker condition is used (The total weight of a subset of all the keywords in the search string exceeds a minimum weight threshold) the object is considered a close match. The matching score between the search request and the object is calculated in step 530 by weighting all the terms in the search request based on their scores in the final colored terms (260 of FIG. 2) for this object. The matching score can be calculated as the sum of the scores of each term, multiplied by the term's weight from the weighted tags table (400 of FIG. 4). Alternative calculation can be:

$$\sqrt[N]{\prod_{n=1}^{N} (Score_n + \text{factor})}$$

The formula is based on a geometrical average. The factor allows us to make the result always positive, even if one of the scores is 0, if this is our wish. In any case, missing term in the final colored set results in a penalty.

In case two consecutive words in the search string match a two-word term, then the score is the sum of the points of this matching two-word term. For example: A search string contains "Orange" and "Juice" as two consecutive words in the search string, and an object has "Orange Juice" keyword. The score for this match is the score associated with the term "Orange Juice".

Notes: (i) Objects that don't have complete match (matching all the keywords) will not be included in the matching list. (If a missing keyword is very important this behavior is OK because this object is not a close match to the search string. On the other hand, if the missing keyword is lagging behind on the importance scale, then this rule can cause a false negative. In order to solve the problem in case of no match with less significant keywords, the system may prompt the user indicating that "keyword X" in the search list prevented the display of certain number of results. The user will have to decide if this keyword is important or not in this case. If the option to re-search without this keyword is appealing, the user will hit the button that says "re-search without Keyword X". The person performing the search gets from the system an option to perform a few searches with different subset combinations of the original search request. This is a trial and error process that we're all familiar with, which helps users refine their search. (ii) If the coloring process is skipped, the matching mechanism simply uses the weighted tags, including the terms and weights as if they are the colored tags in the matching process.

Note: FIG. 5 (like FIG. 2) describes a flow of two different processes. One is an offline process which performs the coloring of the document, and the second is the matching process between the keywords in the search string and the colored documents.

Figure 6:
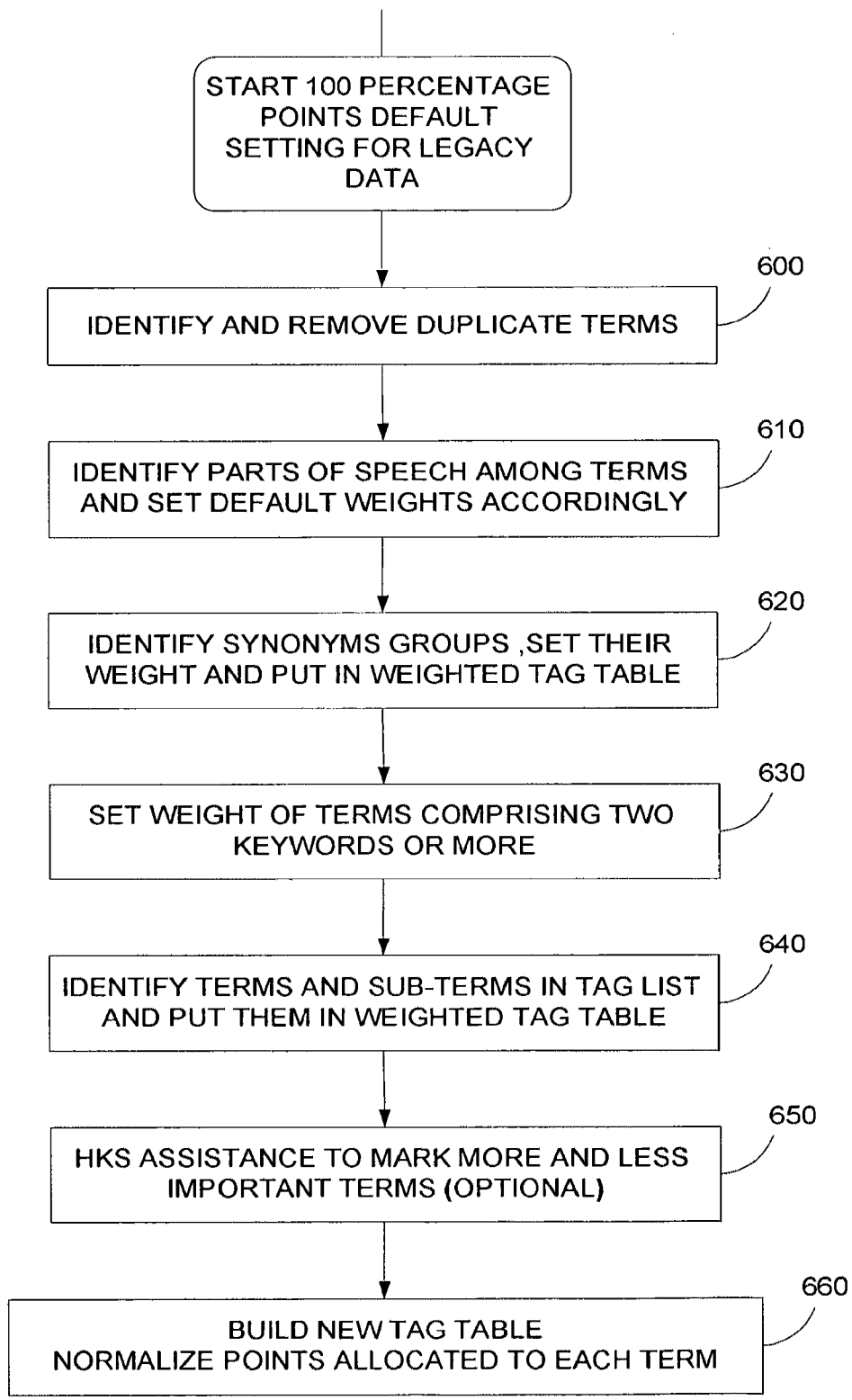
FIG. 6 illustrates major steps in 100 percentage points to keyword/tag sets—default setting to legacy data.

Reference is now made to FIG. 6 which is a schematic overview illustration of an embodiment of the "setting of default values to legacy objects mechanism" of the "100 percentage points to keyword/tag sets" method of the present invention. This is an automated mechanism meant to convert tags of legacy collections of tagged objects to tags that conform to the "100 percentage points to keyword/tag sets" method of the present invention. The search engine will therefore not have to be modified for working on the install base. The methodology which is described herein does not mean to be always accurate. This default setting is meant to result in less false positive results for searches and with a more relevant list of results when operated by the "100 percentage points to keyword/tag sets" engine on a legacy collection of objects with tags. Keywords contain words from all parts of speech (POS) like Nouns, Verbs, Adjectives, etc. Nouns describe more of the highlights or the subject of the image or other tagged object, while adjectives and verbs are more descriptive and distinguish on a finer level between closer images or other close tagged objects. As an object contains more details, it is associated with more nouns. Fewer nouns mean fewer details, and more focus. The system therefore divides the total weight it allocates by default to every object to the different POS it supports: The largest proportion is usually allocated to the Nouns, and the rest is divided between the Verbs and the Adjectives. The percentage point allocation is based on a baseline, like single point to a verb, and a preference factor to a noun, and another preference factor to a verb. The following is an example of two groups of percentage points allocated to the <noun, adjective, verb> set: <1.5, 1.2, 1>, <1.5, 1,1>. In step 600, duplicate tags are removed. In step 610 all the different POS are identified among the keywords of the terms associated with the object, and each one of them gets the value reserved for its POS. Unidentified keywords get a default value for their kind. In step 620 synonyms are identified among the keywords of the terms associated with the object, and inserted into the weighted tags table as an entry in the form of definition 430 (FIG. 4). The weight associated with the inserted entry is determined. It can be for example between the highest weight in the group multiplied by a factor greater than 1 and smaller than 2, up to the sum of all the weights to the words in the group. The rationale behind this method of allocation is that tag creators usually make the effort to put synonyms in order to describe more important ideas. In step 630 terms consisting of two words or more are identified, and get the accumulated points of the keywords that comprise them. The reason is that terms comprised of two words are generally more specific and therefore more important. In step 640 the system identifies tags of the form of strings and substrings as defined herein above in definition 420 (FIG. 4). The weight allocated to the string is the weight of the highest tag in it. The HKS can be used in step 650 to assist in identifying hierarchies of terms and replace the evenly distributed weight allocation as described herein above to importance based allocation as identified by the coloring system. This method of allocation can take into account synonyms added by the original tag creator since synonyms color each other and their common meaning gets more weight. In step 660 a table representing all the default tags and their weights is built according to the syntax defined in FIG. 4. The weights are normalized to sum-up to the total that the system supports.

Note: Auxiliary data may optionally be prepared semi-manually and help categorize the keywords:
1. List of synonyms within all the used keywords that are collected in the system's database.
2. List of meaningless keywords that should not be included in the default weighted list of tags.
3. List of keywords (including strings) that get significantly higher weights when set manually.

Figure 7:
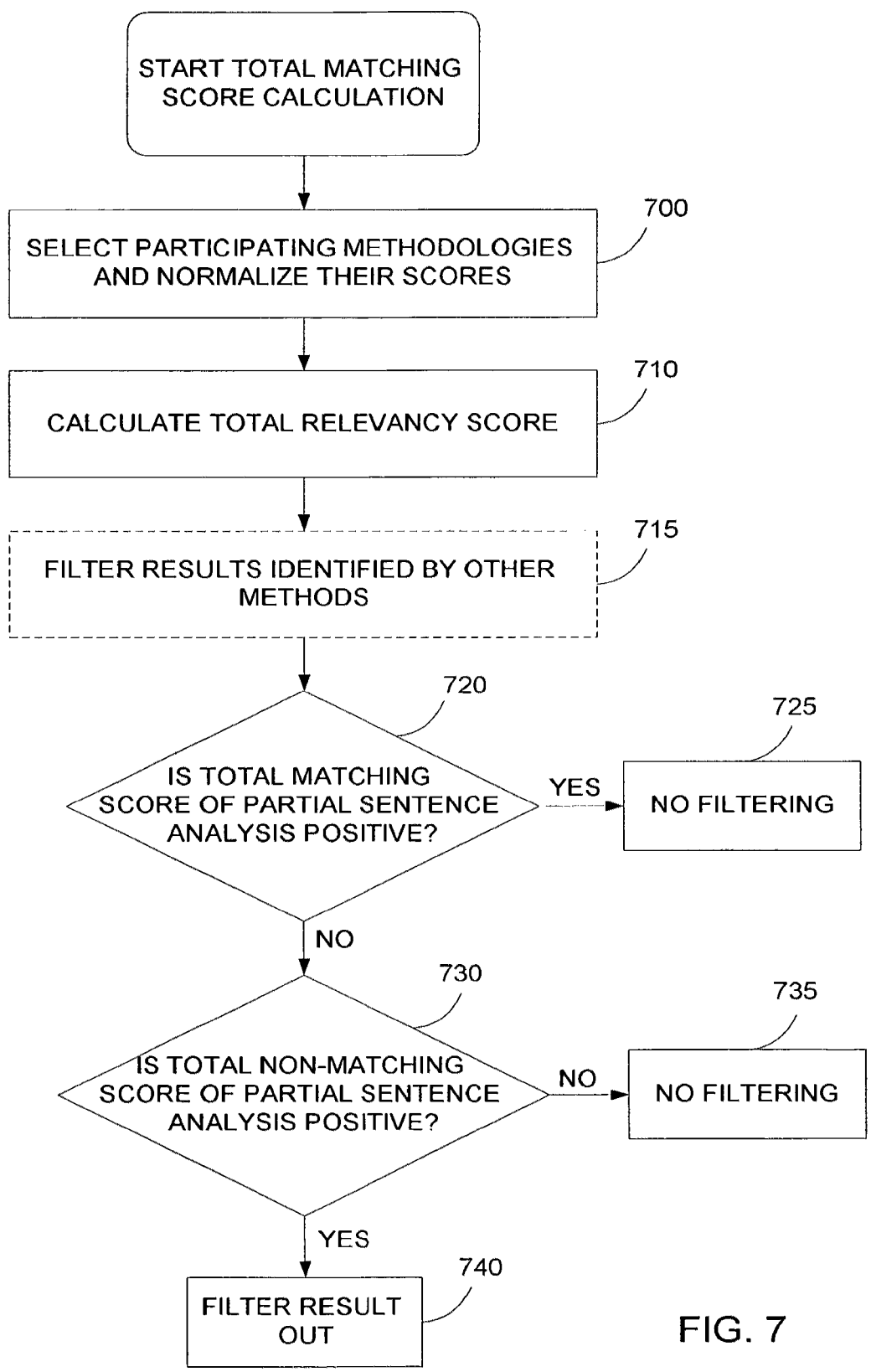
FIG. 7 illustrates major steps in Total matching score calculation.

Reference is now made to FIG. 7, which is a schematic overview illustration of an embodiment of setting the total, overall relevancy ranking method of the present invention. In step 700 the methodologies that were used by the matching processes and scored the document are identified. They can be the whole set or a subset of the methodologies described above, and other methodologies that the search engine is using. Their different scoring scales are normalized. In step 710 the total score is calculated from the relevant methodologies. The relevancy ranking is a weighting of the participating scores, namely a weighted average of the method's rankings. No fixed weight is assigned to each method. A methodology is more prominent as the normalized scores it assigns to the docs it found is higher. This is how the normalization function is built. This guaranties that the more a method draws information the more weight it gets in the overall calculation. Then, optionally, the system filters out false positive results that were categorized relevant by different methodologies. In step 720 the system checks if the total score of the current object includes positive results from the Partial Sentence analysis methodology. If it does, then step 725 leaves it in the matching list with the calculated score from step 710. It doesn't matter if the doc contains conflicting (contradicting) meaning combinations too in addition to matching meanings. If the answer is no, meaning the object does not contain positive results from the Partial Sentence analysis methodology, then the system checks in step 730 if the current object includes conflicting meaning results from the Partial Sentence analysis methodology. If no, step 735 leaves it in the matching list with the calculated score from step 710. If yes, meaning that the current object does include conflicting meaning results (and no matching meaning), then it is filtered out in step 740.

Figure 8A:
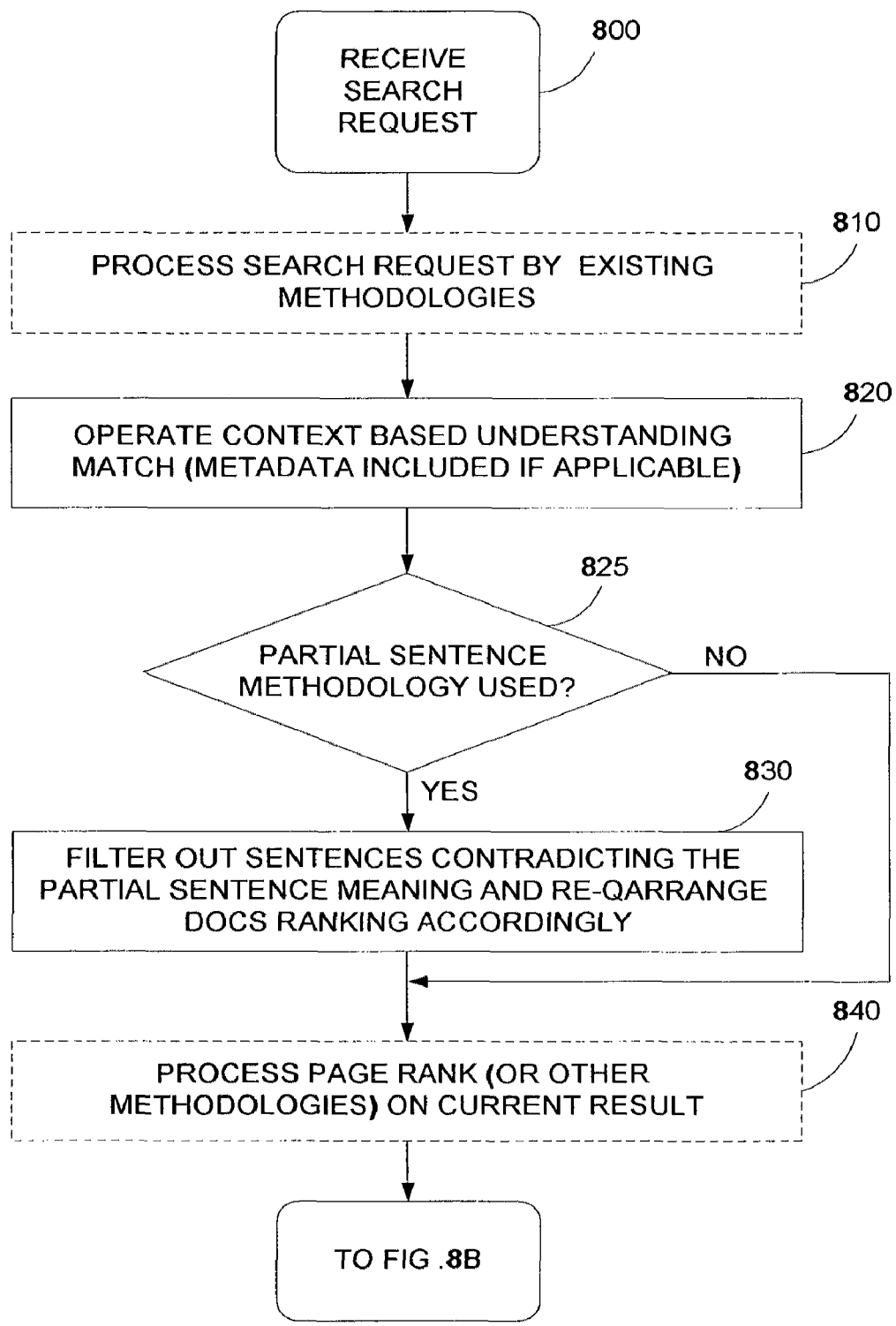
FIG. 8 illustrates a system implementing the methodologies herein and optional integration with other search methodologies.
Figure 8B:
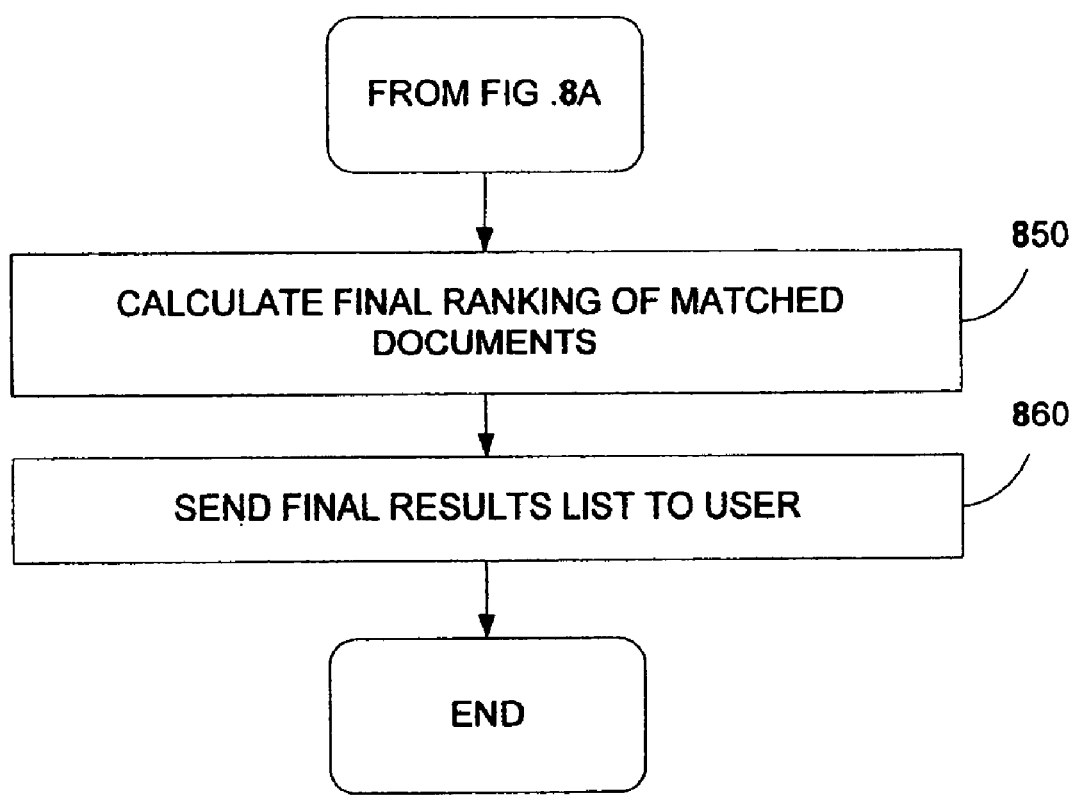

Reference is now made to FIG. 8, which is an illustration of one system implementing the (i) Context based understanding, (ii) 100 percentage points to keyword/tag sets (iii) Partial Sentence analysis and (iv) Total matching score calculation methodologies. Integration with other search methodologies is also supported. In step 800 the system receives a search request, which it processes using all or part of the above mentioned methodologies in steps 820 through 830. Steps 810 and 840 are optional steps executing other/existing search methodologies that the system may integrate with. Step 810 operates external search methodologies and passes on to the system a set of documents with associated grades and ranking to work on. In step 840 grades and ranks are associated with the documents by external methodologies integrated with the system. In step 850 final ranking of the search request to the matched documents is calculated, taking into account the grades and ranks of the different methodologies, and the prominence of the methodologies. It can take into account the system's methodologies, as well as external methodologies. In step 860 a list of ranked documents is sent back to the user.

Figure 9A:
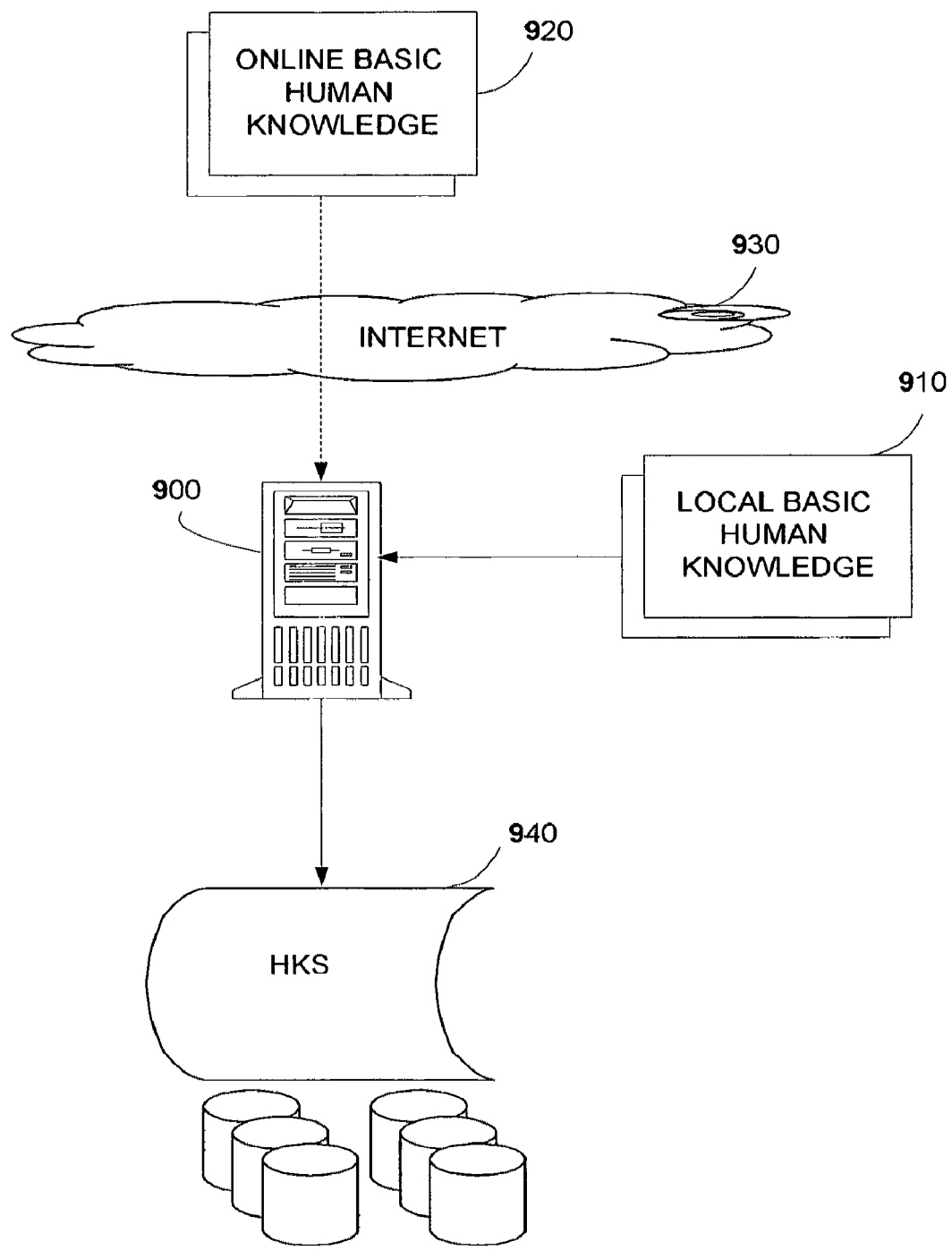
FIGS. 9A through 9C illustrate hardware platforms for implementing the methodologies.
Figure 9B:
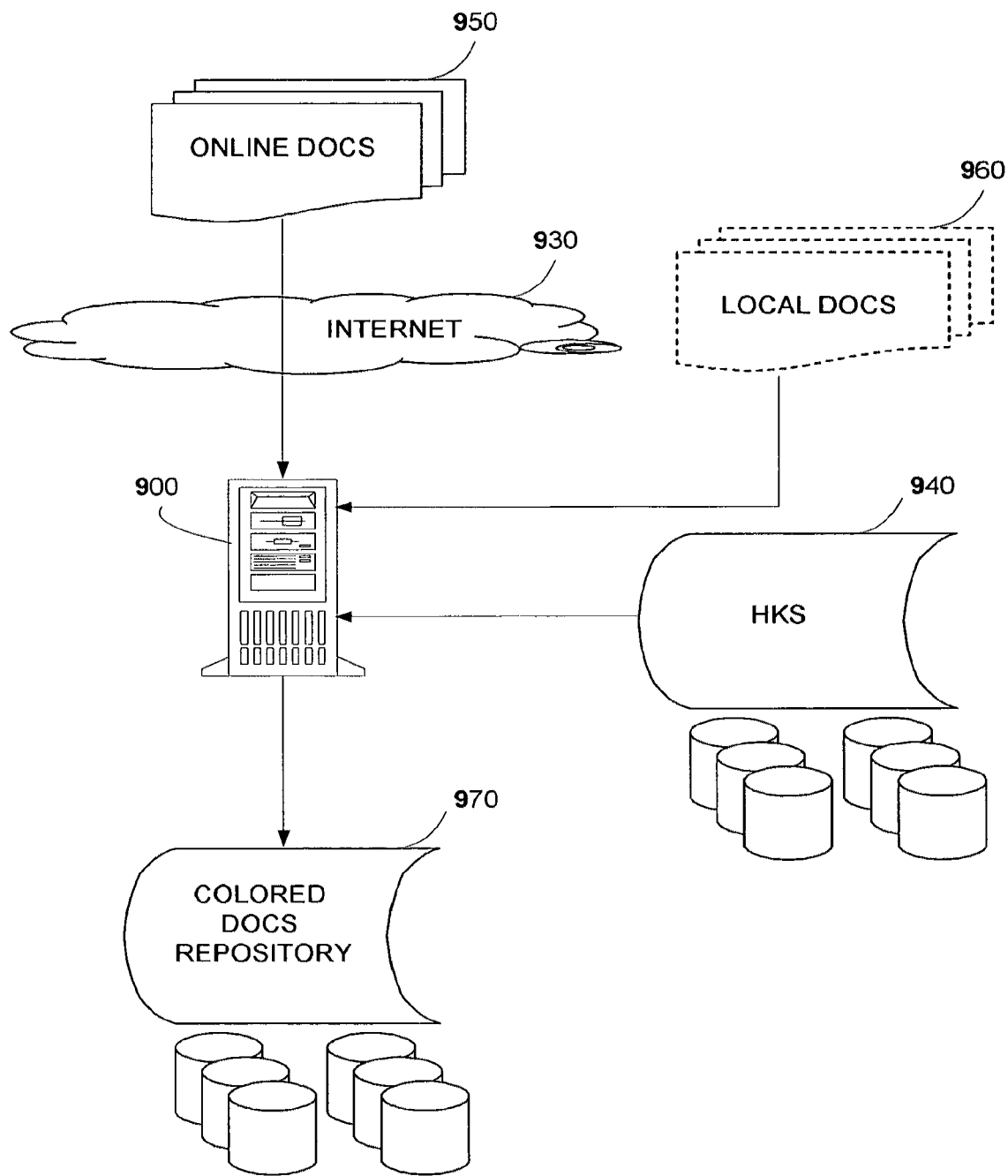
Figure 9C:
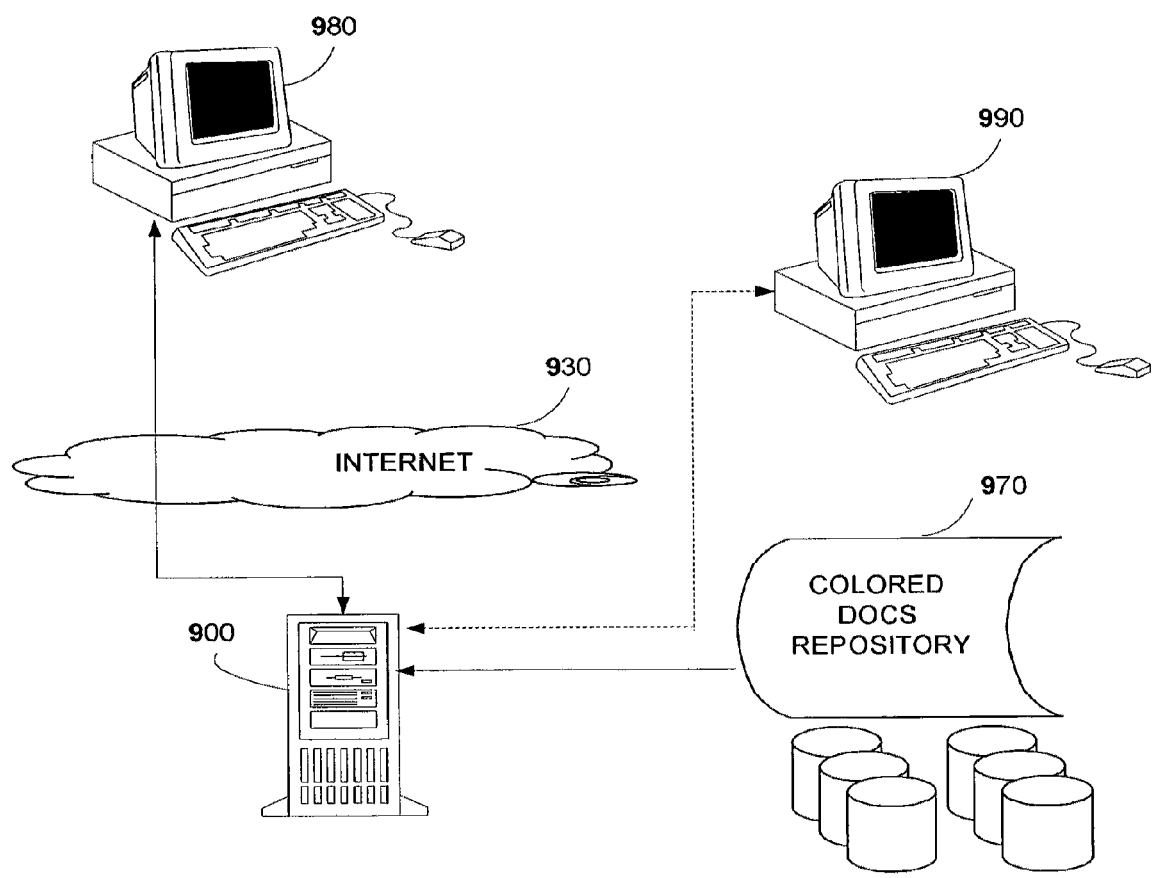

Reference is now made to FIG. 9A through 9C, which are illustrations of the hardware platforms the above processes and methodologies are implemented on.

FIG. 9A depicts an exemplary hardware scheme for building the HKS, comprising one or more severs 900 such as IBM servers & systems products: system x, BladeCenter, and IBM Power system, including communication means, storage means and processing units, offline basic human knowledge sources 910 such as dictionaries, encyclopedias, classified directories etc. manually fed into the servers, optional online basic human knowledge sources 920 fed into the servers via the Internet 930, and the HKS (Human Knowledge Structure) 940, built by extracting terms and their "contain" or "essence" relationships from the server and presenting them in a structured manner. The HKS is stored in database such as SQL or Oracle on disk farms such as IBM system storage.

FIG. 9B depicts an exemplary hardware scheme for performing the coloring process, comprising one or more severs 900 including communication means, storage means and processing units, the HKS (Human Knowledge Structure) 940 communicating with the servers, online documents 950, including documents that are returned as results from other search engines or search engine indexing systems that the present system is integrating with, fed into the servers via the Internet 930, optional local (offline) documents 960 communicated to the servers via any communication means known in the art such as LAN or Intranet, and a colored documents repository 970.

FIG. 9C depicts an exemplary hardware scheme for the performing the matching process, comprising one or more severs 900 including communication means, storage means and processing units, colored documents repository 970 communicating with the servers, online computer means such as Dell: laptops, desktops and workstations or, Lenovo: notebooks, desktops and workstations 980 for communicating search requests to the servers and receiving search results therefrom via the Internet 930, and optional offline computer means 990 for communicating search requests to the servers and receiving search results therefrom.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:
1. A computerized method of arrangement and representation of terms in context, comprising:
providing terms and relations from at least one source;
arranging said terms in a Human Knowledge Structure (HKS), said structure being a directed acyclic graph, wherein each one of said graph's nodes consists of one term and the graph's arcs comprise at least one of "essence" and "contain" relations between adjacent terms, wherein term 'A' is the essence of term 'B', or term 'A' contains term 'B';

providing a document;

identifying in the document frequent terms and marking them with associated respective initial weights on the HKS, said marked terms defining an initial weighted terms set for the document;

creating a final weighted terms set for the document by:
  i. marking on the HKS all the terms connecting between said marked terms;
  ii. calculating weights for said initial and connecting marked terms, based on said at least two relations in the HKS, whereby the marked terms define a weighted set of terms for the document; and
  iii. selecting from said weighted marked terms set terms having weights greater than a predefined threshold, thereby defining a final weighted set of terms for the document; and
  iv. linking said final weighted set of terms to the document.

2. The method of claim 1, wherein said initial weight of a term is its frequency value in the document.

3. The method of claim 1, wherein terms from the header, abstract or keywords set of the document are given higher initial weight values.

4. The method of claim 1, wherein said document comprises a set of terms used as metadata tags to describe the highlights of an object and wherein the initial weights associated with said set of terms sum up to a predefined sum.

5. The method of claim 4, wherein said object is selected from the group consisting of images, video clips, footages, songs, articles, papers and text documents.

6. The method of claim 1, additionally comprising adding to the final weighted set of terms, terms from the document that do not exist in the HKS, with initial weights.

7. The method of claim 1, additionally comprising matching between a set of search terms and a set of documents by:
  identifying terms within the set of search terms;
  retrieving the final weighted sets of terms linked to each of said documents;
  calculating a final matching grade for each of said documents, based on the weights of terms in said final weighted set of terms of the document that are included in the set of search terms; and
  ranking said documents according to said final matching grades.

8. The method of claim 7 wherein the set of search terms is a search string.

9. The method of claim 7, wherein said documents comprise documents provided by at least one of external search methodologies and search engine indexing systems, as results for said set of search terms.

10. The method of claim 7, wherein the set of search terms is a reference document and wherein the step of identifying terms comprises extracting terms from said final weighted set of terms of said reference document.

11. The method of claim 1, additionally comprising matching between a reference document and a set of documents, comprising:
  mapping the final weighted set of terms of said reference document and of each document in said set of documents to a vector in 'n' Euclidean space;
  for each document in the set of documents, calculating the distance between the vector representing the document and the vector representing the reference document; and
  ranking the documents from the set of documents by relevancy to the reference document, measured in distance units.

12. The method of claim 11 wherein said step of mapping is performed using only the terms with the highest weights.

13. A computerized method of matching between a search string and documents, comprising:
  providing a search string comprising terms that form a partial sentence;
  retrieving a set of documents comprising at least part of said partial sentence;
  counting the number of exact occurrences of the partial sentence in each of the retrieved documents;
  counting the number of occurrences of equivalent permutations of the partial sentence that do not conflict with the meaning of the partial sentence in each of the retrieved document;
  counting the number of occurrences of close permutations of the partial sentence that do not conflict with the meaning of the partial sentence in each of the retrieved document;
  for each retrieved document, associating scores to all said counted occurrences, based on the similarity between the occurrence and the partial sentence;
  summing up the scores to a final score for each document; and
  ranking the documents in a result list according to said final scores.

14. The method of claim 13, additionally comprising:
  counting the number of occurrences of permutations of the partial sentence that conflict with the meaning of the partial sentence in each of the retrieved document; and
  associating scores to all said counted occurrences of conflicting permutations in each of the retrieved document.

15. The method of claim 13, wherein said retrieving comprises retrieving documents provided by at least one of external search methodologies and search engine indexing systems, as results for said search string.

16. The method of claim 14, wherein if the number of non-conflicting occurrences of the partial sentence is zero and the number of conflicting occurrences is greater than zero, the document is filtered out.

17. A computerized system for arrangement and representation of terms in context, comprising:
  a server;
  at least one source of terms and relations;
  communication means between said at least one source of terms and relations and said server;
  a first storage device connected with said server;
  means for storing said terms in said first storage device in a Human Knowledge Structure (HKS) being a directed acyclic graph, wherein each one of said graph's nodes comprises one term and the graph's arcs consist of at least one of "essence" and "contain" relations between adjacent terms, wherein term 'A' is the essence of term 'B', or term 'A' contains term 'B';
  at least one source of documents;
  communication means between said at least one source of documents and said server;
  a second storage device connected with said server;
  wherein said server comprises computerized means for:
    receiving a document from said at least one source of documents;

identifying in the document frequent terms and marking them with associated respective initial weights on the HKS, said marked terms defining an initial weighted terms set for the document;

creating a final weighted terms set for the document by:
marking on the HKS all the terms connecting between said marked terms;
calculating weights for said initial and connecting marked, based on said at least two relations in the HKS, whereby the marked terms define a weighted set of terms for the document;
selecting from said weighted marked terms set terms having weights greater than a predefined threshold, thereby defining a final weighted set of terms for the document; and
linking said final weighted set of terms to the document; and means for storing said linked final weighted set of terms in said second storage device.

18. The system of claim 17, additionally comprising:
at least one source of search terms; and
communication means between said at least one source of search terms and said server, wherein the server comprises additional computerized means for:
receiving at least one search term from said source of search terms ; and
matching between said at least one search term and a set of documents received from said at least one source of documents, said additional means comprising means for:
identifying terms within the at least one search term;
calculating a final matching grade for each of said documents, based on the weights of terms in the final weighted set of terms of the documents that are included in the at least one search term; and
ranking said documents according to said final matching grades.

19. A computerized system for matching between a search string and documents, comprising:
a server;
at least one source of search strings;
at least one source of documents;
communication means between said at least one source of search strings and said server; and
communication means between said at least one source of documents and said server, said server comprising computerized means for:
receiving from said at least one source of search strings a search string comprising terms that form a partial sentence;
retrieving from said at least one source of documents a set of documents comprising at least part of said partial sentence;
counting the number of exact occurrences of the partial sentence in each of the retrieved documents;
counting the number of occurrences of equivalent permutations of the partial sentence that do not conflict with the meaning of the partial sentence in each of the retrieved document;
counting the number of occurrences of close permutations of the partial sentence that do not conflict with the meaning of the partial sentence in each of the retrieved document;
for each retrieved document, associating scores to all said counted occurrences, based on the similarity between the occurrence and the partial sentence;
summing up the scores to a final score for each document; and
ranking the documents in a result list according to said final scores.

20. The system of claim 19, wherein said server additionally comprises computerized means for:
counting the number of occurrences of permutations of the partial sentence that conflict with the meaning of the partial sentence in each of the retrieved document; and
associating scores to all said counted occurrences of conflicting permutations in each of the retrieved document.

21. The system of claim 19, wherein said source of documents comprises documents provided by at least one of external search methodologies and search engine indexing systems, as results for said search string.

* * * * *